US008329263B2

(12) United States Patent
Chen et al.

(10) Patent No.: US 8,329,263 B2
(45) Date of Patent: Dec. 11, 2012

(54) METHOD OF COATING A PARTICLE

(75) Inventors: Quan Chen, Singapore (SG); Xian Ting Zeng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 302 days.

(21) Appl. No.: 12/675,554

(22) PCT Filed: Aug. 26, 2008

(86) PCT No.: PCT/SG2008/000315
§ 371 (c)(1),
(2), (4) Date: Jun. 25, 2010

(87) PCT Pub. No.: WO2009/029053
PCT Pub. Date: Mar. 5, 2009

(65) Prior Publication Data
US 2010/0276310 A1 Nov. 4, 2010

(30) Foreign Application Priority Data
Aug. 29, 2007 (SG) ............................... 200706336-5

(51) Int. Cl.
*B06B 1/00* (2006.01)
*B32B 5/16* (2006.01)
*B65D 71/00* (2006.01)
(52) U.S. Cl. ......... 427/600; 206/223; 428/402; 977/773
(58) Field of Classification Search .................. 206/223; 427/600; 428/402; 977/773
See application file for complete search history.

(56) References Cited

U.S. PATENT DOCUMENTS

| 5,578,325 | A  | * | 11/1996 | Domb et al. ................... | 424/501 |
| 6,521,290 | B1 |   | 2/2003  | Kudo et al. | |
| 6,635,735 | B1 |   | 10/2003 | Zhang et al. | |
| 7,601,803 | B1 |   | 10/2009 | Fiedler et al. | |
| 8,088,451 | B2 | * | 1/2012  | Timmons et al. ............. | 427/460 |
| 2011/0226995 | A1 | * | 9/2011 | Tulsky et al. ............ | 252/301.36 |

FOREIGN PATENT DOCUMENTS
JP 563-196621 8/1988
JP 3962102 8/2007
(Continued)

OTHER PUBLICATIONS
Mulvaney, P., et al., J. Mater. Chem. (2000) 10, 1259-1270.
(Continued)

Primary Examiner — Timothy Vanoy
(74) Attorney, Agent, or Firm — Altera Law Group, LLC

(57) ABSTRACT

Disclosed is a method of coating a particle, the method comprising contacting (i) a particle, wherein the surface of the particle comprises functional groups suitable to undergo a coupling reaction with at least a hydroxyl group, a halogen group or an akloxy group, with (ii) molecules of formula (Ia) and/or (Ib): (Ia) or (Ib) wherein A is a metal or a metalloid, $R^1$ and (in formula (Ia)) $R^2$ are halogen or an alkoxy group and $R^{20}$ is OH, halogen or an alkoxy group. $G^1$ is an aliphatic; cycloaliphatic, aromatic, arylaliphatic or arylcycloaliphatic spacer and E is a functional group. Molecules of the compound of general formula (Ia) and/or (Ib) are immobilized on the surface of the particle by a coupling reaction between functional groups on the surface of the particle and moieties $R^{20}$.

20 Claims, 10 Drawing Sheets

FOREIGN PATENT DOCUMENTS

| | | |
|---|---|---|
| WO | WO 96/23879 | 8/1996 |
| WO | WO 01/04144 | 1/2001 |
| WO | WO 01/14497 A1 | 3/2001 |
| WO | WO 03/029462 | 4/2003 |

OTHER PUBLICATIONS

Bauer, F., et al., Macromol. Chem. Phys. (2000) 201, 2654.
Winkler, R.-P., et al., Thin Solid Films (1999) 351, 209.
Turner, M.R., et al., Surface and Interface Analysis (1997) 25, 917.
Abboud, M., et al., J. Mater. Chem. (1997) 7, 8, 1527.
El-Toni, A.M., et al, Coll. Sur. Sci. A: Physicochem. Eng. Aspects (2006) 274, 229.
Holgado, M., et al., Colloid Interface Sci. (2000) 229, 6-11.
Kobayashi, Y., et al., J. Phys. Chem. B (2003) 107, 7420-7425.
Lu, Y., et al., Nano Lett. (2002) 2, 3, 183-186.
Aslam, M., et al., J. Colloid Interface Sci. (2005) 290, 444-449.
Kobayashi, K., et al., J. Mater. Sci. (2005) 40, 263-283.
Sinko, K., & Nemenyi, A., Progr. Colloid Polym. Sci. (2004) 125, 103-110.
Yao, N., et al., Langmuir (2002) 18, 10, 4111-4117.
Yao, N., et al., Catalysis Lett. (2002) 78, 1-4, 37-41.
Beari, F., et al., J. Organomet. Chem. (2001) 625, 208-216.
Graf et al. (Langmuir (2003) 19, 6693-6700).
Hall, S.R., et al. Langmuir (2000) 16, 1454-1456.
Bottini, M. et al., J. Phys. Chem. B (2006)110, 13685-13688.
Vollet; D.R., et al., Journal of Sol-Gel Science and Technology (1999) 15, 5-11.
Donatti, D.A., & Vollet, D.R., Journal of Sol-Gel Science and Technology (2000) 17, 19-24.
Ocotlan-Flores & Saniger (Journal of Sol-Gel Science and Technology (2006) 39, 235-240.
Rao et al. (Journal of Colloid and Interface Science (2005) 289, 125-131.
Ferrari, M., et al. Applied Physics Letters (2006) 88, 203125-1-203125-3.
Cao, M. et al., J. Phys. Chem. B (2006) 110, 26, 13072-13075.
Kim, D., et al., Angew. Chem. Int. Ed. (2007) 46, 3471-3474.
Quemer, C., et al., Chem. Mater. (2006) 18, 4817-4826.
Correa-Duarte, M.A., et al., Chem. Phys. Lett. (1998) 286, 497-501.
Progress in Organic Coatings (2003) 47, 147-153.
Hommel et al., Makromol Chem. (1993) 194, 879-889.
Smith, J.E., et al. Trends in Analytical Chemistry (2006) 26, 9, 848-854.
Tan, W., et al., Medicinal Research Reviews (2004) 24, 5, 621-638.
Ilaides, P., et al., FEBS Lett (1997) 409, 437-441.
Holt, L.J., et al., Trends Biotechnol. (2003) 21, 11, 484-490.
Beste et al., Proc. Natl. Acad. Sci. U.S.A. (1999) 96, 1898-1903.
Skerra, J. Mol. Recognit. (2000) 13, 167-187.
Silverman, Jr., et al., Nature Biotechnology (2005) 23, 1556-1561.
Gill, D.S. & Damle, N.K., Current Opinion in Biotechnology (2006) 17, 653-658.
Kwon, Y.-U., and Kodadek, T., J. Am. Chem. Soc. (2007) 129, 1508-1509.
Song, W., et al., Appl. Phys. A (2001) 72, 361-365.
Zakaznova-Herzog, V.P., et al., Phys. Rev. B (2005) 72, 205113.
International Search Report for PCT application No. PCT/SG2008/000315, mailed Oct. 22, 2008.
Vidal, A., & Donnet, J.B., Bull. Soc. Chim. Fr. (1985) 6, 1088.
Yang & Huang (Macromol. Chem. Phys. (2005) 206, 1967-1972).
Witt et al. (Current Organic Chemistry (2004) 8, 1763-1797).
E.W., et al., Chemistry & Biology (1996) 3, 5, 359-367.
Mosavi, L.K,., et al., Protein Science (2004) 13, 6, 1435-1448.
Stone, E., et al., Journal of Immunological Methods 318 (2007) 88-94.
Office Action issued by the Japanese Patent Office on Oct. 2, 2012 for the corresponding Japanese Patent Application No. 2010-522874; copy of the English translation of said first Office Action.

\* cited by examiner

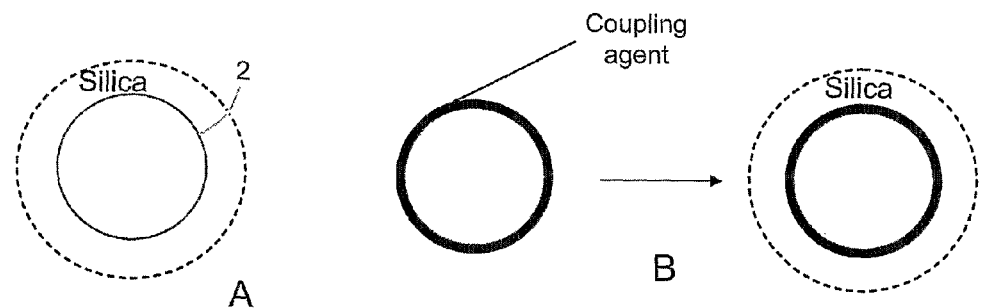
Fig. 1: prior art
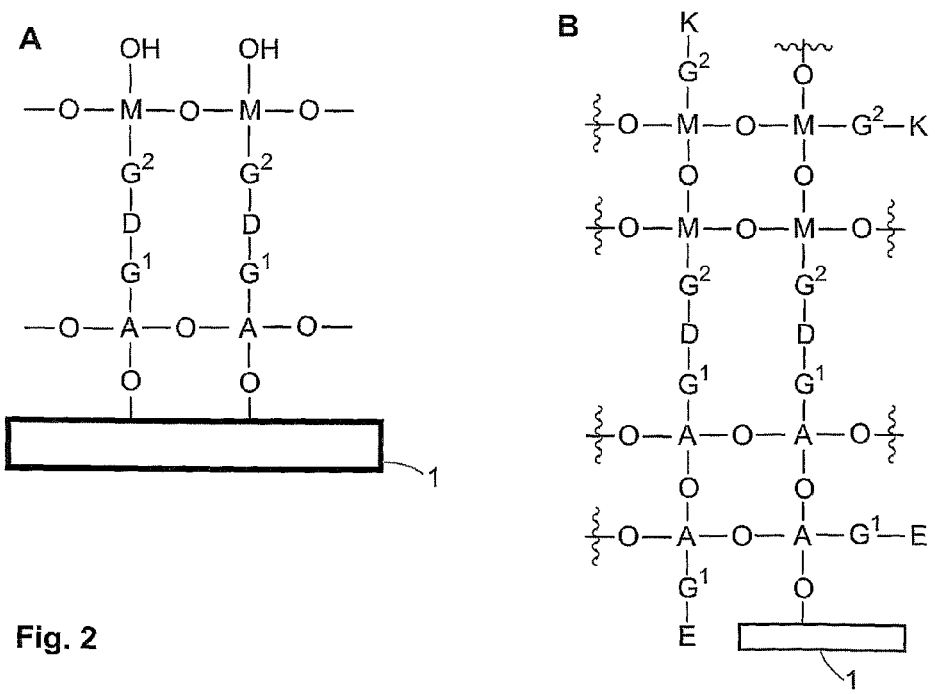
Fig. 2

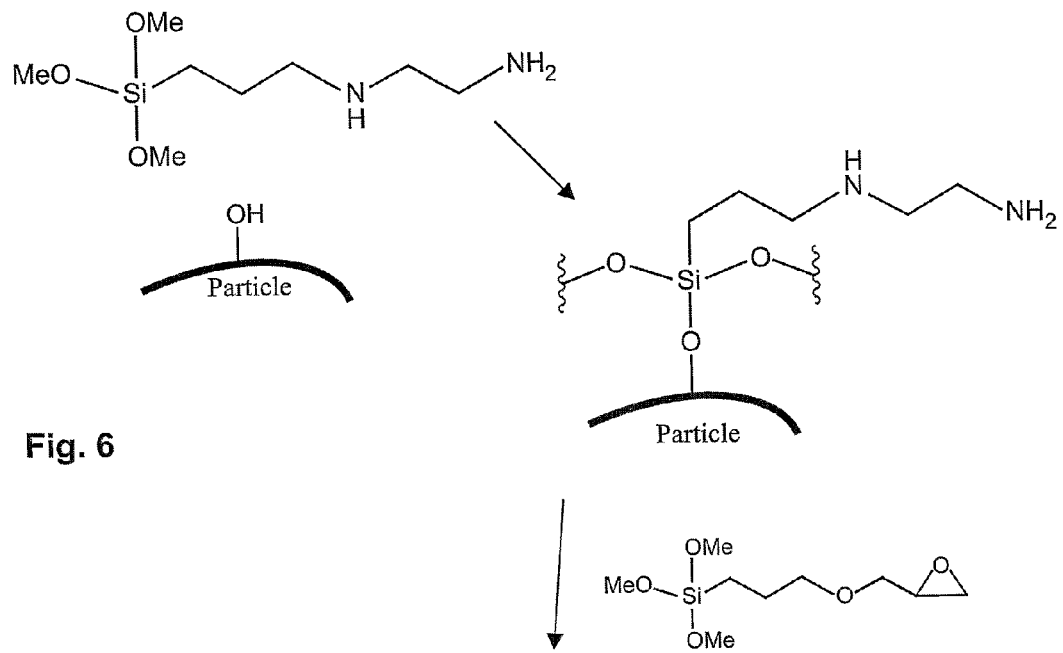
Fig. 6
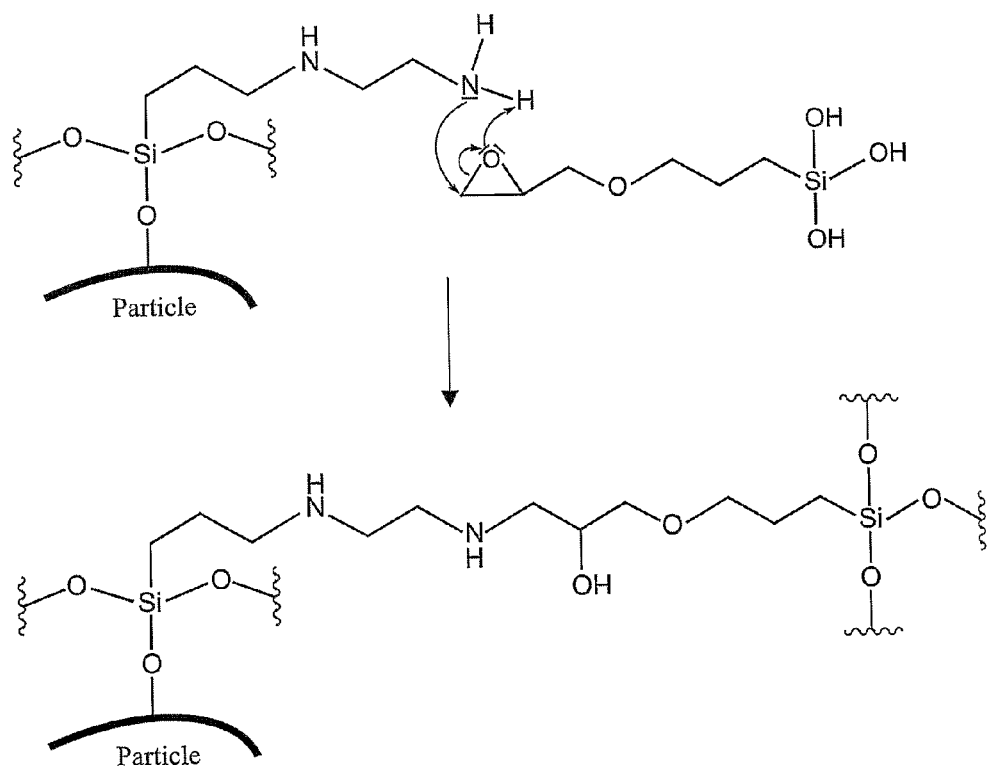

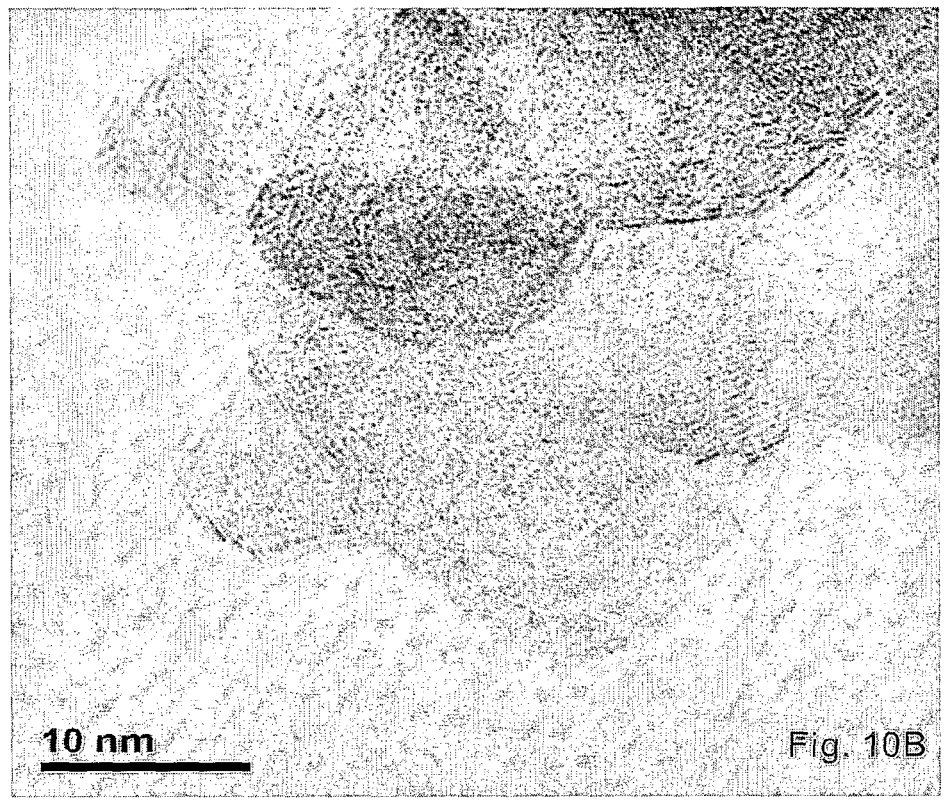
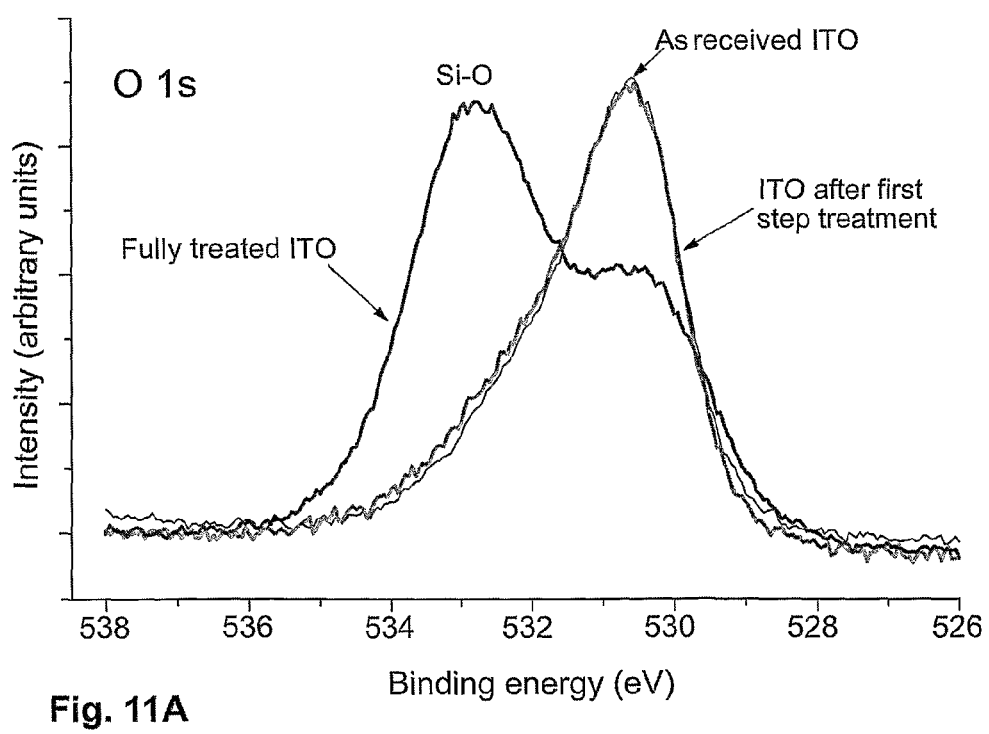
Fig. 11A

Dried powder samples

METHOD OF COATING A PARTICLE

FIELD OF THE INVENTION

The present invention relates to a method of coating a particle, as well as a kit for carrying out the method. The method includes inter alia the reaction with a metal or metalloid compound, which contains a functional group, and exposure to ultrasound.

BACKGROUND OF THE INVENTION

Where a cross-linked material with hydrophilic properties is required, traditionally silica is provided, whether as a coating or as a material as such. Rather than using solid $SiO_2$ crystals, a polymeric network of the formula

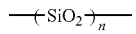

is formed in situ as a polymer of silicic acid. Furthermore, chemical modification of the (usually mesoporous) silica surface offers ample scope for development of materials with pre-assigned properties for various applications.

An example of a current application of silica in order to provide a hydrophilic surface is engineering the properties of nanoparticles. A respective surface pretreatment enables the nanoparticles to be added as filler particles to a polymer, thereby forming a polymer-based nanohybrid. The surface treatment improves in these applications the bonding between filler particles and matrix material. Such engineered nanohybrid materials have become crucial for a number of applications in order to replace expensive metals and ceramics.

Materials constructed from particles below a critical dimension in width display unique chemical, physical and structural properties that differ significantly from macroscale and even atomic scale materials. Particles and tubes of nano-size have therefore become an attractive tool in various applications, in particular where they can be engineered to have specific properties to serve desired functions, such as medical applications. Desired properties of particles of nanosize are usually at least one of increased modulus and strength, transparency, decreased gas permeability, increased scratch, abrasion, heat resistance and decreased flammability.

Furthermore a downside of particles of nanosize is their handling in solution, in particular the handling of metal or metalloid particles (e.g. quantum dots) in aqueous solution. Aggregation and coagulation, as well as "salting out" are a serious problem (see e.g. Mulvaney, P., et al., *J. Mater. Chem.* (2000) 10, 1259-1270). Accordingly, surface treatments, for example with capping agents are commonly used for such applications as well.

Research efforts are currently aiming at optimizing silica coatings for surfaces, in particular nanoparticles and stabilizing sols during the preparation of silica coatings. A synthesis of gold-silica core-shell nanoparticles with tailored surface properties has also been reported recently. The common method of silica-coating of metal (e.g. gold) particles consists of three steps: (1) modification of the nanoparticle surface to make it vitreophilic ("metal oxide loving") by using silane coupling agents having an amino or thiol group such as 3-aminopropyl-trimethoxysilane and 3-mercaptopropyltrimethoxysilane (MPS), (2) slow silica eposition in water from a sodium silicate solution, and (3) extensive growth of the silica shells through sol-gel reaction of silicon alkoxide in ethanol/ammonia mixtures.

Most currently available processes thus require the particle materials to be made in situ by a catalyzed (typically base catalysed) condensation of a sol gel reaction or by a precipitation reaction before a subsequent coating step since this procedure is accompanied with the lowest particle aggregation in the art. However, this procedure greatly limits the application potential of the composite due to the complex nature of the synthesis process that results in either very low productivity or lack of consistence.

Furthermore currently most commercially available nanomaterials come in the form of dried powders or are re-dispersed from the dried state. This inevitably results in the formation of both relatively loose agglomerates—due to electrostatic or Van-der-Waals forces between individual particles—and tighter aggregates, due to tight bonding that is hard to break. Therefore mechanical processing is necessary to disrupt agglomerates and aggregates into smaller units or individual particles. Dispersing respective nano-scale particles accordingly has to include aggregate/agglomerate disruption and stabilization of the dispersion.

Particles treated through regular wet chemical process are currently dispersed by stirring in water or organic solution. This simple process is however insufficient in overcoming agglomeration since the intensity of the force applied is too weak. Furthermore a common reaction process using a silane takes hours in dispersion before it has completely reacted with small particles. This difficulty is particularly significant where a commercially available dried powder is to be treated. Application of certain force is thus needed to keep particles from agglomerating throughout the surface treatment process.

Accordingly it is an object of the present invention to provide an improved coating method that can be used for surface coating of particles.

SUMMARY OF THE INVENTION

In a first aspect the present invention relates to a method of coating a particle. The method includes providing a particle. The surface of the particle includes functional groups suitable to undergo a coupling reaction with at least one of a hydroxyl group, a halogen group, and an alkoxy group. The method further includes providing molecules of general formula (Ia) and/or (Ib)

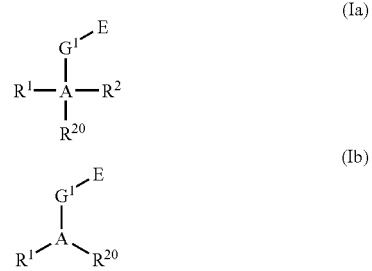

In this formula A is a metal or a metalloid. $R^1$, and in formula (Ia) $R^2$, are an independently selected halogen or alkoxy group. A respective alkoxy group includes a moiety selected from the group consisting of an aliphatic, a cycloaliphatic, an aromatic, an arylaliphatic, and an arylcycloaliphatic group, which includes a main chain of a length of about 0-4 heteroatoms. $R^{20}$ is OH, halogen or an alkoxy group. The alkoxy group includes a moiety selected from an aliphatic group, a cycloaliphatic group, an aromatic group, an arylaliphatic group or an arylcycloaliphatic group. $G^1$ is a spacer, which may be an aliphatic, a cycloaliphatic, an aromatic, an arylaliphatic or an arylcycloaliphatic radical, which includes a main chain of a length of about 0-3 heteroatoms. E is a functional group, such as an aldehyde, an amino, a nitro, a halogen, an azo, a diazo, a hydrazo, a thio, a cyano, a carboxyl, an ester, an anhydride, a sulphonate, a sulphonate ester, an imido ester, a semicarbazide, an isocyano, an aziridine, a phosphoramidite or an epoxy group. The method further includes contacting the molecules of the compound of general formula (Ia) and/or (Ib) and the particle. Thereby a first mixture is formed. The method also includes exposing the first mixture to reaction conditions suitable for a coupling reaction between the functional groups on the surface of the particle and $R^{20}$. Thereby the method firstly includes allowing the formation of covalent links by a reaction between functional groups on the surface of the particle and moieties $R^{20}$ of molecules of the compound of general formula (Ia) and/or (Ib). As a result molecules of the compound of general formula (Ia) and/or (Ib) are immobilised on the surface of the particle. Secondly, the method thereby includes allowing cross-linking of the molecules of the compound of general formula (Ia) and/or (Ib). As a result a precoating is formed on the particle. The method also includes adding molecules of a compound of the general formula (IIa) and/or (IIb)

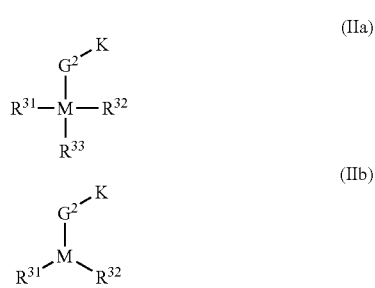

In this formula M is a metal or a metalloid. $R^{31}$ and $R^{32}$ are an independently selected halogen, hydroxyl group or alkoxy group. A respective alkoxy group includes a moiety selected from the group consisting of an aliphatic, a cycloaliphatic, an aromatic, an arylaliphatic and an arylcycloaliphatic group. In formula (IIa) $R^{33}$ is OH, halogen, an aliphatic group, a cycloaliphatic group, an aromatic group, an arylaliphatic group or an arylcycloaliphatic group. $G^2$ is a spacer, which may be an aliphatic, a cycloaliphatic, an aromatic, an arylaliphatic or an arylcycloaliphatic radical that includes a main chain of a length of about 0-3 heteroatoms. K is a functional group such as an aldehyde, an amino, a nitro, an azo, a diazo, a hydrazo, a thio, a cyano, a carboxyl, an isocyano or an epoxy group. The functional group K is suitable for forming a covalent bond with the functional group E of the compound of general formula (Ia) and/or (Ib) (see above). Thereby a second mixture is formed. The method also includes exposing the second mixture to ultrasound. Thereby the method firstly includes allowing the formation of covalent links by an intermolecular reaction between functional groups E of the precoating—the precoating being formed by a reaction between functional groups on the surface of the particle, moieties $R^{20}$, and cross-linking of the molecules of the compound of general formula (Ia) and/or (Ib) (see above)—and functional groups K of molecules of the compound of general formula (IIa) and/or (IIb) added (see above). As a result molecules of the compound of general formula (IIa) and/or (IIb) are immobilised on the surface of the particle. Secondly, the method thereby includes providing sufficient energy to allow cross-linking of the plurality of molecules of the compound of general formula (IIa) and/or (IIb). As a result a coating is formed on the particle.

In a second aspect the invention relates to a coating obtainable by the method according to the first aspect.

In a third aspect the invention provides a particle with a coating according to the second aspect.

In a fourth aspect the invention relates to a kit for coating a particle. The kit includes two containers. The first container includes molecules of a compound of general formula (Ia) and/or (Ib):

$$\begin{array}{c} G^1 \diagdown^E \\ | \\ R^1 - A - R^2 \\ | \\ R^{20} \end{array} \quad \text{(Ia)}$$

$$\begin{array}{c} G^1 \diagdown^E \\ | \\ R^1 \diagup^A \diagdown_{R^{20}} \end{array} \quad \text{(Ib)}$$

In this formula A is a metal or a metalloid. $R^1$, and in formula (Ia) $R^2$, are an independently selected halogen or alkoxy group. A respective alkoxy group includes a moiety selected from the group consisting of an aliphatic, a cycloaliphatic, an aromatic, an arylaliphatic, and an arylcycloaliphatic group, which includes a main chain of a length of about 0-4 heteroatoms. $R^{20}$ is OH, halogen or an alkoxy group. The alkoxy group includes a moiety selected from an aliphatic group, a cycloaliphatic group, an aromatic group, an arylaliphatic group or an arylcycloaliphatic group. $G^1$ is a spacer, which may be an aliphatic, a cycloaliphatic, an aromatic, an arylaliphatic or an arylcycloaliphatic radical, which includes a main chain of a length of about 0-3 heteroatoms. E is a functional group, such as an aldehyde, an amino, a nitro, a halogen, an azo, a diazo, a hydrazo, a thio, a cyano, a carboxyl, an ester, an anhydride, a sulphonate, a sulphonate ester, an imido ester, a semicarbazide, an isocyano, an aziridine, a phosphoramidite or an epoxy group. The second container includes molecules of a compound of the general formula (IIa) and/or (IIb):

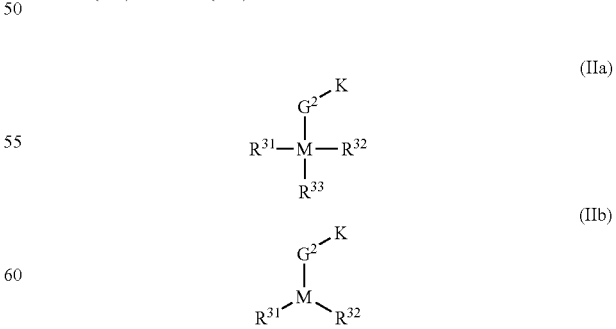

In this formula M is a metal or a metalloid. $R^{31}$ and $R^{32}$ are an independently selected halogen, hydroxyl group or alkoxy group. A respective alkoxy group includes a moiety selected from the group consisting of an aliphatic, a cycloaliphatic, an aromatic, an arylaliphatic and an aryl-cycloaliphatic group. $R^{33}$ in formula (IIa) is OH, halogen, an aliphatic group, a cycloaliphatic group, an aromatic group, an arylaliphatic group or an arylcycloaliphatic group. $G^2$ is a spacer, which may be an aliphatic, a cycloaliphatic, an aromatic, an arylaliphatic or an arylcycloaliphatic radical that includes a main chain of a length of about 0-3 heteroatoms. K is a functional group such as an aldehyde, an amino, a nitro, an azo, a diazo, a hydrazo, a thio, a cyano, a carboxyl, an isocyano or an epoxy group. The functional group K is suitable for forming a covalent bond with the functional group E of the compound of general formula (Ia) and/or (Ib) (see above).

BRIEF DESCRIPTION OF THE DRAWINGS

The invention will be better understood with reference to the detailed description when considered in conjunction with non-limiting examples and the accompanying drawings.

FIG. 1 delineates current procedures of forming a silica coating on a particle as an encapsulation or a shell, which may in some cases be done directly (FIG. 1A) or require a pretreatment with a coupling agent (FIG. 1B).

FIG. 2 shows embodiments of a coating formed according to the present invention, located on the surface of a particle (A, B).

FIG. 6 shows an exemplary coupling reaction scheme of a method of forming a coating according to the present invention.

FIG. 10B depicts a photo of corresponding uncoated nanoparticles as received.

FIG. 11A depicts XPS spectra of ITO nanoparticles as received, after a first treatment with a trialkoxysilane carrying a functional group and of fully treated nanoparticles with a coated surface.

DETAILED DESCRIPTION OF THE INVENTION

Figure 3A:
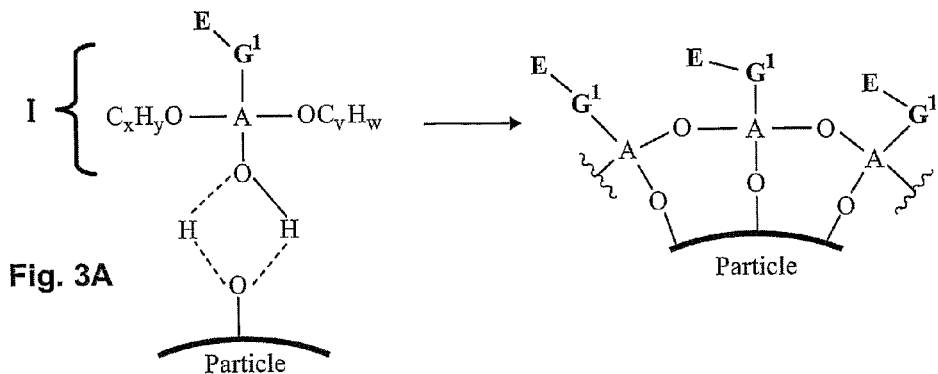
FIG. 3 depicts an example of the method of the present invention, in which a metal or metalloid coupling agent with a linker $G^1$ carrying a functional group E is used in forming a precoating (A), and a further molecule with a linker $G^2$ carrying a functional group K is used to form, i.e. complete, the coating in a sonochemical reaction (B).

The present inventors have developed a method of coating a particle. The coating, which may serve as an encapsulation and which is based on the formation of a copolymer, provides particles with an improved dispersability in aqueous and organic media compared to conventionally coated particles (see e.g. FIG. 12A). The method includes providing reactive sites in a first cross-linked polymer block, which may for example be a coating. These reactive sites are then used to extend the cross-linked matrix by a second cross-linked matrix in a fast and convenient manner upon exposure to ultrasound. The coating provided by the method of the invention can for example provide particles (whether nanosized or microsized, crystal or non-crystal), or provide particles with a coating, that helps in avoiding aggregation difficulties as described above.

Due to its hydrophilic properties silica has found widespread use for the coating of surfaces as illustrated in FIG. 1. The silylation of particles using various functionalized silane reagents has been intensively investigated (e.g. Vidal, A., & Donnet, J. B., *Bull. Soc. Chim. Fr.* (1985) 6, 1088). For applications where nanoparticles are to be added as filler particles to a polymer (see above), altered filler-polymer interactions have been shown to result in improved mechanical properties of the composites. For example, Brauer reported the coating of nanosized silica and alumina particle by methacroyloxy (propyl)trimethoxysilane for scratch and abrasion resistant coating (Bauer, F., et al., *Macromol. Chem. Phys.* (2000) 201, 2654), while Winkler reported surface a surface coating for silica and alumina particles based on epoxy functionalized alkoxysilanes to achieve electrosterically stabilized sols (Winkler, R.-P., et al., *Thin Solid Films* (1999) 351, 209). The nanocomposite that includes the surface modified particles shows good transparency and abrasion resistance (ibid.). Turner and Abboud investigated ceramic oxide powders like $Al_2O_3$, $ZrO_2$, $TiO_2$ with surfaces modified by 3-(trimethoxysilyl)propylmethacrylate (gamma-MPS) (Turner, M. R., et al., *Surface and Interface Analysis* (1997) 25, 917; Abboud, M., et al., *J. Mater. Chem.* (1997) 7, 8, 1527).

Nanoparticles with a core-shell or encapsulated structure have been developed, consisting of a semiconductor or metal nanoparticle and a silica shell. The use of seeded polymerization to suppress the photocatalytic activity of titania (El-Toni, A. M., et al, *Coll. Sur. Sci. A: Physicochem. Eng. Aspects* (2006) 274, 229), use of the non-ionic surfactant poly(vinylpyrrolidone) (PVP) to form condenser silica as well as the coating of silica particles with titania (Holgado, M., et al., *Colloid Interface Sci.* (2000) 229, 6-11) illustrate the need of improved coatings in the art. The encapsulation has been applied to magnetite and other ferrite materials such as Co, FePt, and Fe have (Kobayashi, Y., et al., *J. Phys. Chem. B* (2003) 107, 7420-7425; Lu, Y., et al., *Nano Lett.* (2002) 2, 3, 183-186, see also Kobayashi, Y., et al., *J. Phys. Chem. B* (2003) 107, 7420-7425 and Lu, Y., et al., *Nano Lett.* (2002) 2, 3, 183-186).

The coating of particles with an inert silica shell can also be used as a stabilizing technique (Mulvaney, P., et al., *J. Mater. Chem.* (2000) 10, 1259-1270). In this regard the role of the silica shell is two-fold: firstly it provides a greatly enhanced colloidal stability in water, secondly it can also be used to control the distance between core particles within assemblies through shell thickness. In a third aspect, oxide protection can assist in stabilizing particles under extreme conditions. As an additional feature, the coating may provide moieties for the attachment of desired molecules, such as receptor molecules (see also below). As an example, FePt nanoparticles have been encapsulated by silica using oleic acid and oleyl amine for stabilisation purposes (Aslam, M., et al., *J. Colloid Interface Sci.* (2005) 290, 444-449).

The common method of silica-coating consists of three steps: (1) modification of the nanoparticle surface to make it vitreophilic ("metal oxide loving") by using silane coupling agents with an amino or thiol group such as 3-aminopropyltrimethoxysilane and 3-mercaptopropyltrimethoxysilane (MPS), (2) slow silica deposition in water from a sodium silicate solution, and (3) extensive growth of the silica shells through a sol-gel reaction of silicon alkoxide in ethanol/ammonia mixtures.

The method of the present invention yields a coating that can be taken as including a copolymer of two cross-linked blocks. For a covalent linkage of these blocks a chemical reaction between suitable functional groups is employed. The method includes providing a particle, providing molecules and contacting the same with each other. Any particle may be used (see below) that has a surface that includes a plurality of functional groups. If no functional groups are present on the surface, they may be introduced as illustrated below. The functional groups are suitable to undergo a coupling reaction with at least a hydroxyl group, a halogen group or an alkoxy group. Examples of functional groups that may be present on the surface of the particle include, but are not limited to, an aldehyde, an amino, a nitro, an azo, a diazo, a hydrazo, a thio, a cyano, a carboxyl, an isocyano or an epoxy group. The functional groups present on the particle may all be identical. In other embodiments the surface of the particle includes any number of different functional groups.

The molecules provided are molecules of a metal or metalloid compound. Depending on the valency of the metal or metalloid, the compound is of the general formula (Ia) or (Ib):

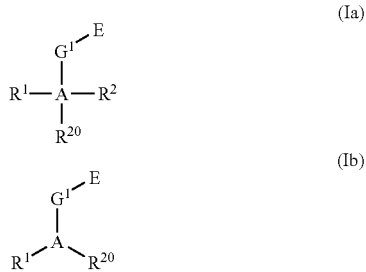

In this formula A is a metal or a metalloid. Any metal or metalloid may be used. Illustrative examples of a suitable metal include, but are not limited to aluminium, titanium, gallium, zirconium, cerium, and composites thereof. Examples of suitable metalloids include, but are not limited to silicon, boron, germanium, antimony and composites thereof. $R^1$, and in formula (Ia) $R^2$, are an independently selected halogen or alkoxy group. A respective alkoxy group includes a moiety that is an aliphatic, a cycloaliphatic, an aromatic, an arylaliphatic or an arylcycloaliphatic group.

The term "aliphatic" means, unless otherwise stated, a straight or branched hydrocarbon chain, which may be saturated or mono- or poly-unsaturated and include heteroatoms, i.e. atoms that differ from carbon, such as N, S, Se, O or Si. An unsaturated aliphatic group contains one or more double and/or triple bonds (alkenyl or alkinyl moieties). The branches of the hydrocarbon chain may include linear chains as well as non-aromatic cyclic elements. The hydrocarbon chain, which may, unless otherwise stated, be of any length, and contain any number of branches. Typically, the hydrocarbon (main) chain includes 1 to 5, to 10, to 15 or to 20 carbon atoms. Examples of alkenyl radicals are straight-chain or branched hydrocarbon radicals which contain one or more double bonds. Alkenyl radicals normally contain two to twenty carbon atoms and one or two double bonds, such as about two to about ten carbon atoms, and one double bond. Alkynyl radicals normally contain two to twenty carbon atoms and one or two triple bonds, such as two to ten carbon atoms, and one triple bond. Examples of alkynyl radicals are straight-chain or branched hydrocarbon radicals which contain one or more triple bonds. Examples of alkyl groups are methyl, ethyl, propyl, butyl, pentyl, hexyl, heptyl, octyl, nonyl, decyl, the n isomers of these radicals, isopropyl, isobutyl, isopentyl, sec-butyl, tert-butyl, neopentyl, and 3,3 dimethylbutyl. Both the main chain as well as the branches may furthermore contain heteroatoms as for instance N, O, S, Se or Si or carbon atoms may be replaced by these heteroatoms.

The term "alicyclic" means, unless otherwise stated, a non-aromatic cyclic hydrocarbon moiety, which may be saturated or mono-or poly-unsaturated. The cyclic hydrocarbon moiety may be substituted with non-aromatic cyclic as well as chain elements. The cyclic hydrocarbon moiety may also include fused cyclic ring systems and may also be substituted with non-aromatic cyclic as well as chain elements. The main chain of the cyclic hydrocarbon moiety may, unless otherwise stated, be of any length and contain any number of non-aromatic cyclic and chain elements. Typically, the hydrocarbon (main) chain includes 3, 4, 5, 6, 7 or 8 main chain atoms in one ring. Examples of such moieties include, but are not limited to, cylcopentyl, cyclohexyl, cycloheptyl, or cyclooctyl. Both the cyclic hydrocarbon moiety and, if present, any cyclic and chain substituents may furthermore contain heteroatoms, as for instance N, O, S, Se or Si, or a carbon atom may be replaced by these heteroatoms. The term "alicyclic" also includes cycloalkenyl moieties which that are unsaturated cyclic hydrocarbons, which generally contain about three to about eight ring carbon atoms, for example five or six ring carbon atoms. Cycloalkenyl radicals typically have a double bond in the respective ring system. Cycloalkenyl radicals may in turn be substituted.

The term "aromatic" means, unless otherwise stated, a planar cyclic hydrocarbon moiety of conjugated double bonds, which may be a single ring or include multiple fused or covalently linked rings, for example, 2, 3 or 4 fused rings. The term aromatic also includes alkylaryl. Typically, the hydrocarbon (main) chain includes 5, 6, 7 or 8 main chain atoms in one cycle. For illustration purposes, examples of a suitable aromatic moiety include, but are not limited to, benzene, imidazole, benzimidazole, 4H-pyran, pyrazole, pyrazine, pyrrole, pyridazine, furan, indole, benzindole, thiophene, benzofuran, naphthofuran, pyridine, bipyridine, indole, 2H-isoindole, anthrathiobenzene, naphtalene, triazaanthracene, [10]annulen (1,3,5,7,9-cyclodecapentaenyl-), [12] annulen, [8]annulen, thia[11]annulen, phenalene (perinaphthene), 1,9-dihydropyrene, chrysene (1,2-benzophenanthrene, anthraxcene, quinoline, naphthaquinoline, isoquinoline, quinazoline, cinnoline, quinoxaline, oxazol, oxonin, oxepin, benzoxepin, azepin, thiepin, selenepin, thionin, azecin (azacyclodecapentaene), diazecin, thiazine, thiazole, isothiazole, 1H-azepine, dibenzopyridine, azocine, diazecin, benzazocin, 1H-azonine, azaundecin, oxepine, thiepine, thiaphanthrene (naphtha[2,3-b] thiophene), phenanthro[3,2-b]thiophene, 1-oxa-1H-benz[f] indene (naphtho[2,3-b]furan), and furo[3,2-b]pyridine. An example of an alkylaryl moiety is benzyl. The main chain of the cyclic hydrocarbon moiety may, unless otherwise stated, be of any length and contain any number of heteroatoms, as for instance N, O, S, Se and Si. Were several heteroatoms are present within the one or more rings of the aromatic moiety, they are independently selected.

By the term "arylaliphatic" is meant a hydrocarbon moiety, in which one or more aromatic moieties are substituted with one or more aliphatic groups. Thus the term "arylaliphatic" also includes hydrocarbon moieties, in which two or more aryl groups are connected via one or more aliphatic chain or chains of any length, for instance a methylene group. Typically, the hydrocarbon (main) chain includes 5, 6, 7 or 8 main chain atoms in each ring of the aromatic moiety. Examples of arylaliphatic moieties include, but are not limited, to 1-ethyl-naphthalene, 1,1'-methylenebis-benzene, 9-isopropylanthracene, 1,2,3-trimethyl-benzene, 4-phenyl-2-buten-1-ol, 7-chloro-3-(1-methylethyl)-quinoline, 3-heptyl-furan, benzomorpholine, 6-[2-(2,5-diethylphenyl)ethyl]-4-ethylquinazoline, 1,3-benzodioxole, 9,10-dihydro-anthracene, [3.3]orthocyclophane (5,6,7,12,13,14-hexahydro-dibenzo[a,f]cyclodecene) or 7,8-dibutyl-5,6-diethyl-isoquinoline.

Each of the terms "aliphatic", "alicyclic", "aromatic" and "arylaliphatic" as used herein is meant to include both substituted and unsubstituted forms of the respective moiety. Substituents my be any functional group, as for example, but not limited to, amino, amido, azido, carbonyl, carboxyl, cyano, isocyano, dithiane, halogen, hydroxyl, nitro, organometal, organoboron, seleno, silyl, silano, sulfonyl, thio, thiocyano, trifluoromethyl sulfonyl, p-toluenesulfonyl, bromobenzenesulfonyl, nitrobenzenesulfonyl, and methanesulfonyl.

Generally, in above formulas (Ia) and (Ib), $R^1$ and $R^2$ may include up to four heteroatoms in its main chain, i.e. atoms that differ from carbon, such as N—, S—, Se— or O. $R^{20}$ may be a hydroxyl group (—OH), a halogen atom or an alkoxy group. The alkoxy group includes an aliphatic group, a cycloaliphatic group, an aromatic group, an arylaliphatic group or an arylcycloaliphatic group. In some embodiments $R^{20}$ may include up to about four heteroatoms in its main chain. $G^1$ is a spacer selected from an aliphatic, a cycloaliphatic, an aromatic, an arylaliphatic, and an arylcycloaliphatic radical (see above). Any respective moiety may be included as a spacer as long as it does not derogate the integrity of the formed cross-linked block (see below) or of the selected functional group E. In some embodiments the spacer may include up to about 4 heteroatoms in its main chain, such as up to about 3 or up to about 2 heteroatoms. The main chain of the spacer $G^1$ may include any number of carbon atoms (whether alicyclic, aliphatic, aromatic or arylaliphatic). The respective main chain may for instance include 1, 2, 3, 4, 5, 6, 7 or 8 carbon atoms. E is a functional group, such as an aldehyde, an amino, a nitro, a halogen, an azo, a diazo, a hydrazo, a thio, a cyano, a carboxyl, an ester, an anhydride, a sulphonate, a sulphonate ester, an imido ester, a semicarbazide, an isocyano, an aziridine, a phosphoramidite or an epoxy group. A respective functional group may in some embodiments be masked by a protective group. A large number of protective groups, which are well known to those skilled in the art, is available for various functional groups. As an example, carboxylic groups as nucleophiles may be protected by converting them into an ester, while hydroxyl groups may for instance be protected by an isopropylidene group. Such protective groups may be removed after polymerisation and thus provide additional options for modifications of the obtained linear polymer. For example, the isopropylidene protective group shielding a hydroxyl group may be removed by acid treatment. Those skilled in the art will furthermore be aware that such protective groups may have to be introduced well in advance during the synthesis of the respective compound.

Figure 4:
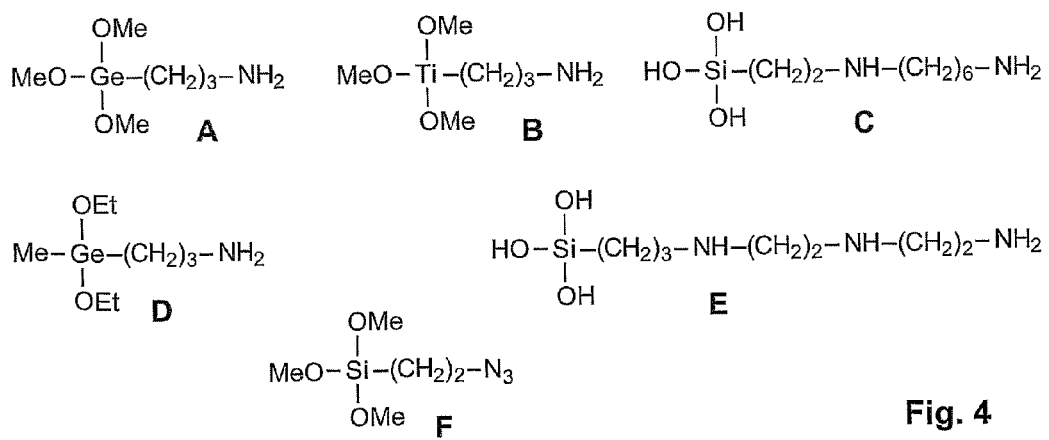
FIG. 4 depicts examples of compounds (A-S) suitable to be included into the cross-linked matrix of the metal oxide or metalloid oxide of the coating.
Figure 4:
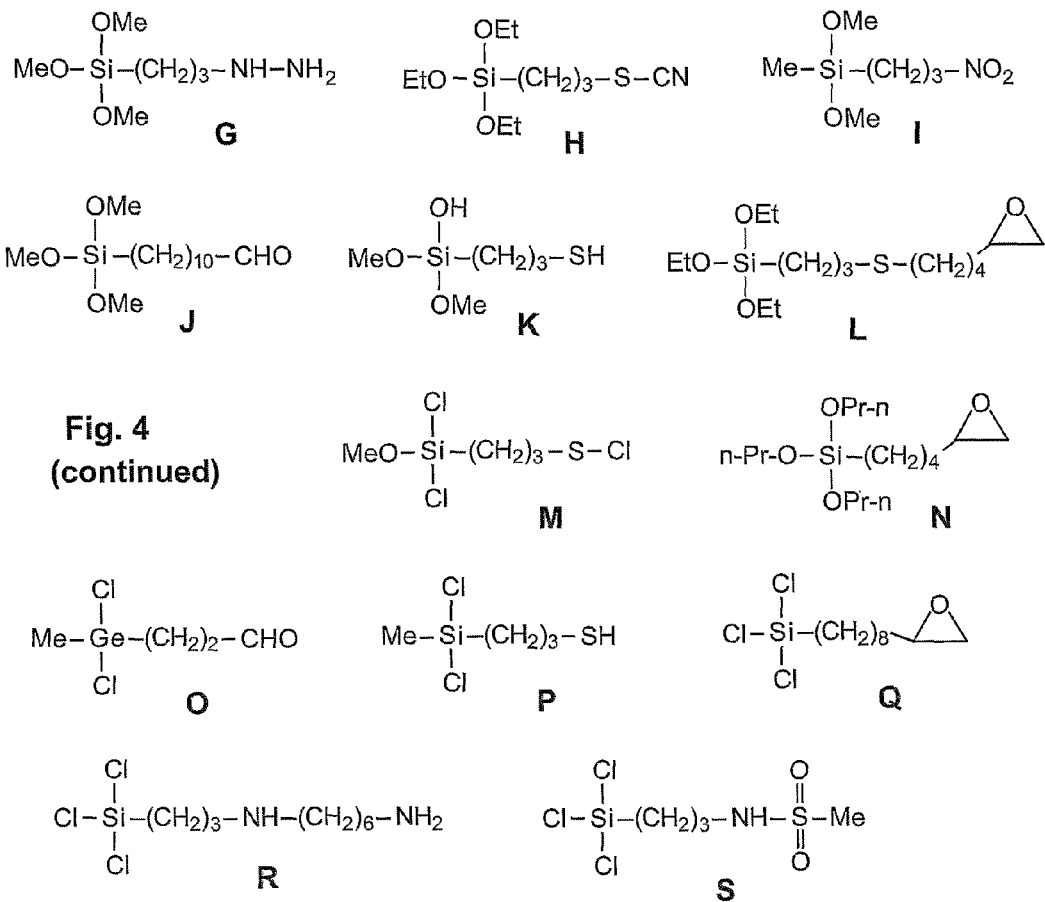

Illustrative examples of compounds that are suitable as a monomer of general formula (Ia) are depicted in FIG. 4. Further examples include, but are not limited to, 3-[dimethoxy(methyl)germyl]propylamine (CAS-No. 342901-46-6), 3-(trichlorogermyl)butyraldehyde (CAS-No. 18479-16-8), 3-(dichloromethylgermyl)-propanal (CAS-No. 42202-26-6), β-(trichlorogermyl)propionaldehyde (CAS-No. 18479-15-7), dichloro(1-ethoxyethenyl)-cerium (CAS-No. 94616-76-9), dichloro(cyanomethyl)-cerium (CAS-No. 138123-05-4), N-[2-(trichloro-silyl)ethyl]-1,3-propanediamine (CAS-No. 157974-43-1), N-[3-(trichlorosilyl)propyl]-1,2-ethanediamine (CAS-No. 73448-62-1), 16-(trichlorosilyl)-1-hexadecanamine (CAS-No. 34290 4-01-2), 5-(trichlorosilyl)-1-pentanamine (CAS-No. 898235-08-0), N-[3-(dichloromethylsilyl)propyl]-1,2-ethanediamine (CAS-No. 827627-58-7), N-[3-(trichlorosily)propyl]-methane-sulfonamide (CAS-No. 685901-33-1), (3-nitropropyl)-trichlorosilane (CAS-No. 18165-63-4), dichloroethyl-(3-nitropropyl)-silane (CAS-No. 18293-68-0), trichloro(3-nitropropyl)-silane (CAS-No. 18165-63-4), 2-(dichloromethylsilyl)-ethanethiol (CAS-No. 51833-46-6), 3-(trichlorosilyl)-1-propanethiol (CAS-No. 88334-67-2), 3-(dichloromethylsilyl)-1-propanethiol (CAS-No. 88334-68-3), 3-(dichloromethylsilyl)propionaldehyde (CAS-No. 38198-90-2), 2-(dichloromethylsilyl)propionaldehyde (CAS-No. 38198-89-9), 3-(trichlorosilyl)-propanoic acid (CAS-No. 17760-35-9), 3-(trichlorosilyl)-propionic acid methyl ester (CAS-No. 18147-81-4), γ-(trichlorosilyl)butyric acid chloride (CAS-No. 62581-57-1), 4-(dichloroethylsilyl)-butyryl chloride (CAS-No. 17200-97-4), 3-(dichloromethylsilyl)-propanoyl chloride (CAS-No. 18797-20-1), trichloro (2-oxiranylethyl)-silane (CAS-No. 135806-33-6), trichloro [3-(oxiranylmethoxy)propyl]-silane (CAS-No. 75705-43-0), trichloro(12-oxiranyldodecyl)-silane (CAS-No. 170007-69-9), trichloro(12-oxiranyldodecyl)-silane (CAS-No. 170007-69-9), 5-(trichloro-silyl)-pentanenitrile (CAS-No. 253788-38-4), thiocyanic acid 7-(trichlorosilyl)heptyl ester (CAS-No. 147490-27-5), thiocyanic acid 17-(trichlorosilyl) heptadecyl ester (CAS-No. 182681-30-7), (3-chloropropyl) trimethoxy-silane (CAS-No. 2530-87-2), (5-chloropentyl) trimethoxy-silane (CAS-No. 15303-42-1), (5-bromopentyl) trimethoxy-silane (CAS-No. 773893-02-0), 5-bromopentyltriethoxysilane (CAS-No. 65973-67-3), (3-bromopropyl)methyldimethoxysilane (CAS-No. 130769-49-2), (10-bromodecyl)triethoxy-silane (CAS-No. 652159-43-8), (3-iodo-propyl)trimethoxysilane (CAS-No. 14867-28-8), 11-(trimethoxysilyl)-undecanal (CAS-No. 250684-37-8), 2,2-dimethyl-5-(trimethoxysilyl)-pentanal (CAS-No. 875478-12-9), 3-(triethoxysilyl)-propanal (CAS-No. 88276-83-9), dimethoxymethyl(3-nitropropyl)-silane (CAS-No. 174529-36-3), thiocyanic acid 2-(trimethoxysilyl)ethyl ester (CAS-No. 126030-12-4), thiocyanic acid 3-(dimethoxymethylsilyl)propyl ester (CAS-No. 503608-63-7), 1-(3-mercaptopropyl)-1,1-dimethoxy-silanol (CAS-No. 123381-58-8), 2-(trimethoxysilyl)ethanethiol (CAS-No. 7538-45-6), 10-(trimethoxysilyl)-1-decanethiol (CAS-No. 143099-67-6), 6-(trimethoxysilyl)-1-hexanethiol (CAS-No. 136594-90-6), 3-(triethoxysilyl)-1-propanamine (CAS-No. 919-30-2), 8-(trimethoxysilyl)-1-octanamine (CAS-No. 253596-68-8), 17-(trimethoxysilyl)-1-heptadecanamine (CAS-No. 163193-

89-3), 4-(triethoxysilyl)-2-butanamine (CAS-No. 14338-90-0), 1-[3-[(2-aminoethyl)amino]propyl]-1-methyl-silanediol (CAS-No. 83145-66-8), N-(dimethoxymethylsilyl)-1,2-ethanediamine (CAS-No. 41159-50-6), [3-(2,3-epoxypropoxy)-2-methylpropyl]-triethoxy-silane (CAS-No. 30652-30-3), N-[3-(methyldipropoxysilyl)propyl]-1,2-ethanediamine (CAS-No. 80190-62-1), 7-ethoxy-7-methyl-1-oxiranyl-2,6,8-trioxa-7-siladecane (CAS-No. 99791-28-3), methylbis(1-methylethoxy)[(3-methyloxiranyl)methyl]-silane (CAS-No. 78719-81-0), 4,5-epoxyheptylmethyldimethoxysilane (CAS-No. 194141-96-3), trimethoxy[3-(oxiranylmethoxy)decyl]-silane (CAS-No. 207512-59-2), (2-azidoethyl)trimethoxy-silane (CAS-No. 83315-71-3) and [3-(trimethoxysilyl)propyl]-hydrazine (CAS-No. 481681-83-8).

As noted above, in some embodiments the functional group E of a compound of general formulas (Ia) and (Ib) may be shielded by a protective group. A few illustrative examples of respective compounds include dichloro[(1E)-1-methyl-4-(2-methyl-1,3-dioxolan-2-yl)-1-butenyl]-cerium (CAS-No. 637311-58-1), dichloro[1-(diethoxymethyl)-1-propenyl]-cerium (CAS-No. 874916-57-1), [2-(5-methyl-1,3-dioxolan-2-yl)ethyl]-trimethoxysilane (CAS-No. 25760-59-2), (3,3-diethoxypropyl)triethoxy-silane (CAS-No. 15184-27-7), (3,3-dimethoxypropyl)triethoxy-silane (CAS-No. 349112-98-7), (3,3-diethoxypropyl)triethoxy-silane (CAS-No. 15184-27-7), 4-(diethoxymethylsilyl)-butyraldehyde dibutyl acetal (CAS-No. 1518 4-37-9), (11,11-dimethoxyundecyl)triethoxy-silane (CAS-No. 786687-01-2), (3,3-dimethoxy-2-methylpropyl)dimethoxymethyl-silane (CAS-No. 349112-97-6), and [10-(1,3-dioxolan-2-yl)decyl]triethoxy-silane (CAS-No. 866935-66-2).

In some embodiments further compounds are added to facilitate or assist the cross-linking reaction. As an illustrative example, a compound of the general formula (Ic) may be added, in which A, $G^1$, $R^1$, $R^2$ and E have the same meaning as explained above for the compounds of formula (Ia) and (Ib):

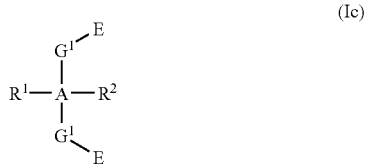

Illustrative examples of compounds of general formula (Ic) are dichlorobis(3-oxiranylpropyl)-silane (CAS-No. 91149-12-1), bis(3-aminopropyl)tetraethoxydisiloxane (CAS-No. 17907-78-7), 2-(trimethoxysilyl)-1,3-propanediamine (CAS-No. 75522-79-1), 1,3-bis(3-thiocyanatopropyl)-1,1,3,3-tetramethoxy-disiloxane (CAS-No. 60147-67-3), 1,1,3,3-tetramethoxy-1,3-bis[3-(oxiranylmethoxy)propyl]-disiloxane (CAS-No. 39006-72-9), 2-(trimethoxysilyl)-1,4-butanedithiol (CAS-No. 142521-52-6), 1,3-bis(3,4-epoxybutyl)-1,1,3,3-tetramethyl-disiloxane (CAS-No. 18053-70-8), dimethoxybis(oxiranylmethyl)-silane (CAS-No. 266337-39-7) and dimethoxybis(3-oxiranylpropyl)-silane (CAS-No. 91149-10-9). A further example of a compound that may be added is a molecule with two different spacers and/or functional groups, such as 4-[2-[1,1,3,3-tetramethoxy-3-[3-(phenylamino)propyl]disiloxanyl]ethyl]-benzoic acid (CAS-No. 139262-63-8).

The molecules of the compound of general formula (Ia) and/or (Ib) are contacted with the particle. The mixture that is thereby formed is then exposed to reaction conditions suitable for a coupling reaction between the functional groups on the surface of the particle and $R^{20}$. The mixture may for example be heated and exposed to a change of pH, such as an acidification or an alkalinisation.

The formation of covalent links between the functional groups on the surface of the particle and the compound of general formula (Ia) and/or (Ib) is thereby allowed. These covalent links may for instance be the bridge —O—, the bridge —S—, the bridge —Se— or the bridge —NH— to the metal or metalloid A of the compound of general formula (Ia) and/or (Ib). The covalent links are formed by a reaction between functional groups on the surface of the particle and moieties $R^{20}$ of molecules of the compound of general formula (Ia) and/or (Ib).

In typical embodiments an excess of molecules of a compound of formula (Ia) and/or (Ib) with respect to the functional groups on the surface of the particle is provided. As an example, the amount of molecules of a compound of formula (Ia) and/or (Ib) used may be selected to be sufficient to leave the surface of particle with at least one layer of a cross-linked precoating (that includes monomeric units formed by a compound of formula (Ia) and/or (Ib)). For this purpose the amount of functional groups on the surface of the particle may be analytically determined or calculated. The amount of molecules of a compound of formula (Ia) and/or (Ib) to be used may also conveniently be determined empirically by way of experiments. A molar amount molecules of a compound of formula (Ia) and/or (Ib) that has been found or calculated to correspond to the amount of functional groups on the surface may be used as well as any excess of a compound of formula (Ia) and/or (Ib), such as about 10-fold, 20-fold, 50-fold, 100-fold or several hundred times the amount calculated or found to correspond to the number of functional groups on the surface of the particle.

As a result, additional molecules of a compound of formula (Ia) and/or (Ib) are available, which have a non-reacted group $R^{20}$. Such additional molecules can undergo a reaction with those molecules of a compound of formula (Ia) and/or (Ib) that are immobilised on the surface of the particle. The method of the invention includes allowing the molecules of the compound of formula (Ia) and/or (Ib) to cross-link. Thereby molecules immobilised on the surface of the particle are included in the forming cross-linked network, such that a precoating is formed on the particle.

As an illustration, the method of the invention typically includes allowing pairs of moieties selected from $R^1$, $R^{20}$ of remaining non-reacted molecules of the plurality of molecules of a compound of general formula (Ia) and/or (Ib), and, if the compounds that were added are of formula (Ia), $R^2$, to undergo an intermolecular chemical reaction. If the molecules are of formula (Ia), $R^1$ and $R^2$ of molecules of formula (Ia) immobilised on a particle will react with $R^1$, $R^2$ and $R^{20}$ of another, non-immobilised molecule of formula (Ia). Such non-immobilised molecules of the plurality of molecules of the compound of general formula (Ia) will further react with other such non-immobilised molecules. As a result a covalent link is formed between each of these molecules. Upon forming a covalent link, typically $R^1$ and $R^2$, as well as previously non-reacted $R^{20}$, are converted into a different moiety, linking the respective metal or metalloid atoms. A covalent link between molecules of a compound of general formula (Ia) and/or (Ib) may for instance be defined by the bridge —O—, the bridge —S—, the bridge —Se— or the bridge —NH— between the metal or metalloid A of the molecules of the compound of general formula (Ia). Thereby the plurality of molecules of a compound of general formula (Ia) and/or (Ib) is cross-linked.

The cross-linked block typically forms a matrix, which may provide a meshwork, which may be formed to any desired extent. As an illustrative example, a cross-linked matrix of silica, titania, gallia or germania, which includes additional linkers $G^1$ with functional groups E, may be formed. It may also be formed on the surface of a substrate (see below), for example in the form of a layer. As a further illustrative example molecular units of one of the following structures may have been present in such a cross-linked matrix:

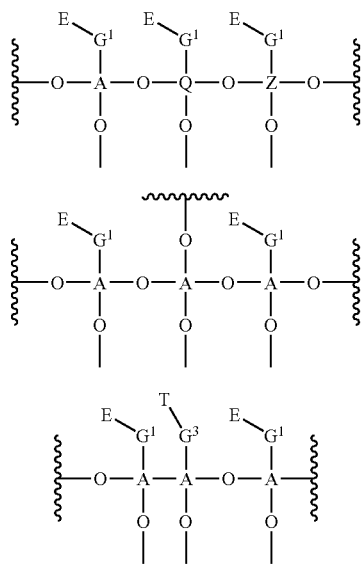

In these formulas E is the functional group, illustrated above. $G^3$ is an optionally present additional spacer carrying a further functional group T shown in structure (IIIc). $G^3$ may be an aliphatic, a cycloaliphatic, an aromatic, an arylaliphatic or an arylcycloaliphatic radical, which includes a main chain of a length of about 0-3 heteroatoms. The functional group T may be selected from the examples above. A may for instance be Si, Ti, Ga or Ge, see also above. In formula (IIIa) Q and Z are an independently selected metal or metalloid (see above), such as Si, Ti, Ga or Ge.

The cross-linked block may include any desired number of further monomer units. As an illustrative example, any compound of one or more of the following general formulas (IV), (V), (VI), (VII) and (VIII) have been added before allowing the plurality of molecules of general formula (Ia) and/or (Ib) to be cross-linked:

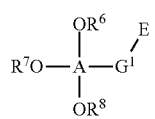

(IV)

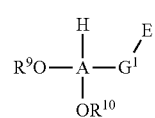

(V)

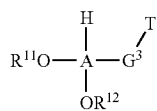

(VI)

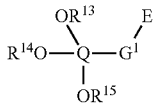

(VII)

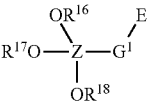

(VIII)

In these formulas A, $G^1$, E, Q, T and Z correspond to the respective moieties above. $R^6$-$R^{18}$ are independently selected aliphatic, cycloaliphatic, aromatic, arylaliphatic or arylcycloaliphatic groups or H. Respective alkoxy groups are known to form a silica mesh structure by condensation.

In some embodiments of the method of the invention cross-linking the plurality of molecules of the compound of general formula (Ia) and/or (Ib) involves the sol-gel process. The sol-gel process, which is well established in the art, briefly involves forming a sol of a metalloid oxide or a metal oxide. An illustrative example of a respective sol is a silica sol, i.e. a homogenous suspension of colloidal silica-based particles, for instance nanoparticles. This sol may for instance be generated by hydrolysis of one or more precursors such as a metal alkoxide or a metalloid alkoxide, e.g. a silicon alkoxide (cf. also FIG. 3). Both molecular precursors and nanoparticles may be used, depending on the intended purpose and size of the substrate. In the method of the present invention a respective metal alkoxide or metalloid (e.g. silicon) alkoxide contains the functional group $G^1$ (see above). Thus, compounds of general formulas (I), (III), (IV), (V) and (VI) may for instance be used. Noteworthy, a further metal alkoxide, metalloid alkoxide, metal salt or metalloid salt such as a chloride or nitrate (see e.g. Kobayashi, K., et al., *J. Mater. Sci.* (2005) 40, 263-283; Sinkó, K., & Neményi, A., *Progr. Colloid Polym. Sci.* (2004) 125, 103-110) may be added, as long as the reaction conditions allow the incorporation of the molecule carrying the functional group $G^1$ into the subsequently formed gel-network. The hydrolysis of a metal alkoxide or a metalloid alkoxide is thought to induce the substitution of alkoxy ($OR^{50}$, wherein $R^{50}$ is an aliphatic, cycloaliphatic, aromatic, arylaliphatic or arylcycloaliphatic group) groups linked to the metal/metalloid by metal oxide/metalloid oxide (e.g. silanol)-OH groups, which then lead to the formation of a network via condensation polymerisation. If desired, ultrasound may be applied during the formation of the sol, for example in order to assist or achieve in forming a sol with a narrow particle size distribution (Yao, N., et al., *Langmuir* (2002) 18, 10, 4111-4117; Yao, N., et al., *Catalysis Lett.* (2002) 78, 1-4, 37-41).

Typically, but not limited thereto, sol preparation by hydrolysis of a metal/metalloid alkoxide can be performed in a mixture of water and an alcohol such as ethanol or isopropanol. Any known catalyst such as hydrochloric acid or ammonia may be added as well. Hence, in the method of the invention, sol-gel protocols using acid-catalyzed, base-catalyzed and two-step acid-base catalyzed procedures may for instance be followed. In embodiments that employ an acid-catalysed process, the pH value may for instance be in the range of about 1 to about 4, such as for example about pH 3.

It is noted in this regard that a variety of compounds of general formula (Ia) and (Ib) typically does not require the presence of a catalyst. In particular the hydrolysis and condensation of metal/metalloid compounds such as silanes or germanes having primary amino groups in aqueous solution is usually auto-catalysed (Beari, F., et al., *J. Organomet. Chem.* (2001) 625, 208-216).

Where desired, two different sols may be formed separately and subsequently combined, such as a germanium oxide sol and a silica sol (see also below). This may allow optimizing reaction conditions on an individual level, e.g. in terms of solvent, reaction time or temperature in embodiments, where more than one metal or metalloid A is desired to be present in the first cross-linked block. Notwithstanding this option, in respective embodiments a single sol may be formed from different metal/metalloid alkoxides, as is well known in the art (see e.g. Sinkó, K., & Neményi, A., 2004, supra).

The sol subsequently undergoes a catalysed transition to form a gel. Before this occurs, the sol may be transferred in order to achieve a desired form. Alternatively the sol may for instance be prepared in a device that already provides the desired final form. In some embodiments forming a gel from a sol includes contacting the sol with a substrate. Contacting the sol with a substrate may for instance include depositing the sol onto a substrate. The transformation to a gel ("aging") can for example achieved by changing the pH or the concentration of solution; this causes aggregation of the colloidal particles in the sol and results in a skeleton composed of interconnected nanometer particles surrounding pores that are generally bigger than in the corresponding material derived from molecular precursor. A respective gel is believed to include three-dimensional and interpenetrated networks of solvent and formed solid.

Further processing may involve forming a gel using a selected technique followed by gentle drying to remove the solvent. An obtained gel may be cast and moulded to form a microporous preform and dried to produce a monolithic bulk material such as a xero gel or an aerogel. It can also be spin coated, dipped, sprayed or applied by electrophoresis or thermophoresis to form a thin film on a selected substrate. The film may be of any desired thickness, for example from about 10 to about 500 nm. Those skilled in the art will be aware of the fact that thicker films may be prepared by repeated processing, e.g. repeated spin-coating. In other embodiments a fiber can be drawn from the gel.

The dried gel usually includes interconnected nanoscale or sub-nanoscale porosity. Those skilled in the art will be aware of the fact that the size of the pores of material obtained by the sol-gel process depends on the conditions selected during processing (for instance the catalyst and the solvent used). The porosity may be left for a subsequent step of the method of the invention, or alternatively be by incorporating a further material using techniques such as liquid infiltration or chemical reaction. In the latter case a nanocomposite may be formed. For example a second phase obtained by sol-gel routes or any other desired matter, generally organic material, including monomeric matter, can be incorporated as a monomer within the dried gel. In case of monomeric matter a polymerization thereof may be performed. The nanoscale porosity of the dried gel may also be reduced or removed by subsequent sintering at higher temperatures. In such embodiments it may be desired to select the respective functional group that is resistant to, shows no, shows limited or shows a controlled reactivity at the selected conditions to ensure that a functional group remains available for the subsequent step of the method of the invention.

If a dense rather than a nanoporous material is desired, drying may be followed by sintering at higher temperatures. The high surface area leads to rapid densification, which can be accompanied by significant grain growth if temperatures are too high. Those skilled in the art will however be aware of the fact that at increased temperatures silanol groups present on the silica surface (see above) are eliminated. Above a certain temperature, which depends on the individual material, this process is known to be irreversible.

The sol-gel method may also be used to form a respective gel on particles, which are used as seed particles for the growth of the respective metaloxide/metalloid oxide network. Further, adding an alkoxy metalloid (e.g. an alkoxysilane) to form metalloid oxide (e.g. silica) shells results for example in the "Stöber growth", yielding smooth surfaces. As an illustrative example, the coating of gold and silver colloids, boehmite rods, gibbside platelets and polystyrene spheres using poly(vinylpyrrolidone) and tetraethoxysilane has been described by Graf et al. (*Langmuir* (2003) 19, 6693-6700). Colloidal gold can for instance be functionalized with small organic compounds, thereby introducing functional groups that can react with an organotrialkoxysilane, thus allowing the formation of an organosilica shell (Hall, S. R., et al. *Langmuir* (2000) 16, 1454-1456). If desired, a surfactant may be added to stabilize a particle such as an iron oxide particle before reacting it with a sol of a metal oxide or a metalloid oxide (Lu, Y., et al., *Nano Lett.* (2002) 2, 3, 183-186).

In some embodiments in addition to one or more compounds of the general formulas (Ia), (Ib), (IV), (V), (VI), (VII) and (VIII) (see above), which contain a functional group capable of forming a covalent bond with the functional group K (see below), an additional compound of comparable structure is employed. This additional compound contains a functional group that is capable of forming a covalent bond with a provided substrate, e.g. the surface of a particle or a nanotube. This additional compound may be added simultaneously or sequentially with the one or more compounds of the general formulas (I), (IV), (V), (VI), (VII) and (VIII). As an illustrative example a particle or nanotube may be functionalized with a mercaptoalkyltrialkoxy-metalloid (e.g. a silane) in a first step, for instance assisted by ultrasound (see e.g. Bottini, M. et al., *J. Phys. Chem. B* (2006) 110, 13685-13688; Mulvaney et al., 2000, supra). Thereafter a compound of one of the general formulas (I), (III), (IV), (V) or (VI) may be added and cross-linked with the immobilised first compound via hydrolysis of alkoxy groups of either of the two compounds.

In some embodiments the method of the invention may include washing the particle with the obtained precoating on its surface. This may for example be carried out in order to remove any remaining non-reacted compounds of general formula (Ia) and/or (Ib), as well as to remove molecules of any additional compound that may have been added, such as an acid or a base.

The method of the invention further includes adding a plurality of molecules of a further metal or metalloid compound. Depending on the valency of the metal or metalloid, this further compound is of the general formula (IIa) or (IIb):

-continued

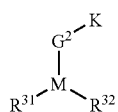
(IIb)

In this formula M is a metal or a metalloid. Any metal or metalloid may be selected. The metal or metalloid may for instance be selected from the examples above. In some embodiments M is different from the metal or a metalloid A. In some embodiments the two metals or metalloids are identical. $R^{31}$ and $R^{32}$ are an independently selected halogen, hydroxyl group or alkoxy group. A respective alkoxy group includes a moiety selected from the group consisting of an aliphatic, a cycloaliphatic, an aromatic, an arylaliphatic and an arylcycloaliphatic group. $R^{33}$ in formula (IIa) is a hydroxyl group, halogen, an aliphatic, a cycloaliphatic, an aromatic, an aryl-aliphatic or an arylcycloaliphatic group that includes 0-4 heteroatoms. In some embodiments $R^{33}$ is an alkoxy group, which may include an aliphatic, a cycloaliphatic, an aromatic, an arylaliphatic or an arylcycloaliphatic group. The main chain of a respective group may include 0 to about 3 heteroatoms. $G^2$ is a spacer selected from an aliphatic, a cycloaliphatic, an aromatic, an arylaliphatic, and an arylcycloaliphatic radical. The main chain of $G^2$ may include 0 to about 4 heteroatoms, such as 0 up to about 3 heteroatoms, i.e. atoms that differ from carbon. K is a functional group selected from an aldehyde, an amino, a nitro, an azo, a diazo, a hydrazo, a thio, a cyano, a carboxyl, an isocyano or an epoxy group. The functional group K is suitable for providing a covalent bond with the functional group E of the compound of the general formula (Ia) and/or (Ib). K will often differ from the functional group E (see above), such that the two functional groups E and K are suitable for undergoing a chemical reaction, in order to form a covalent bond.

The obtained mixture of the cross-linked plurality of molecules of the compound of general formulas (Ia) and/or (Ib) and the compound of the general formulas (IIa) and/or (IIb) is then reacted to form a copolymer of two cross-linked blocks. Using the available techniques of the art such a further processing step would pose a significant challenge, in particular with regard to forming a second cross-linked block. The sol-gel process for example generally would require the addition of a co-solvent in order to activate the compounds of formula formulas (IIa) and/or (IIb). Depending on the form in which the compound of the general formula II is provided—as well as the form in which the first cross-linked block has been obtained—a further challenge often arises in physical terms: Aggregates are formed, in particular where particles are involved, e.g. where the first crosslinked block has been formed on the surface of a particle.

The method of the present invention employs ultrasound in forming a respective coating. Ultrasound is not only able to assist in dispersing particles if used, but is suitable for initiating and sustaining a chemical reaction in any solvent, including an aqueous solvent. Thus, for example the sol-gel process can be carried out in form of a sonochemical reaction. Ultrasound has high-frequency sound (ultrasonic) waves and can be taken to be a cyclic sound pressure. The prefix "ultra" refers to the frequency of ultrasound, which is greater than the upper limit of human hearing (which is approximately 20 kHz).

Ultrasound is known to be able to act as a catalyst in certain chemical reactions (e.g., oxidation, reduction, hydrolysis, polymerization and depolymerization, molecular rearrangements). Application of ultrasound can accelerate some chemical processes, thereby allowing them to be carried out at lower temperatures or more efficiently. Ultrasound has also been identified as suitable for the hydrolysis of alkoxy groups. In the presence of oxalic acid (Vollet; D. R., et al., *Journal of Sol-Gel Science and Technology* (1999) 15, 5-11) and hydrochloric acid (Donatti, D. A., & Vollet, D. R., *Journal of Sol-Gel Science and Technology* (2000) 17, 19-24) as a catalyst tetramethoxysilane and tetraethoxysilane, respectively, have for example been hydrolysed in aqueous media. Using strong ultrasonic irradiation Ocotlán-Flores & Saniger (*Journal of Sol-Gel Science and Technology* (2006) 39, 235-240) have obtained a $SiO_2$ gel from tetraethoxysilane in argon-saturated water under a continuous flow of argon. Rao et al. (*Journal of Colloid and Interface Science* (2005) 289, 125-131) obtained silica nanoparticles by applying ultrasound to a solution of tetraethoxysilane in ethanol in the presence of ammonium hydroxide. In contrast thereto, the method of the invention includes exposing the mixture of the compounds of formula formulas (IIa) and/or (IIb) and the cross-linked plurality of molecules of the compound of general formulas (Ia) and/or (Ib) to ultrasound. The presence of argon or another inert gas is not required.

Upon forming the above mixture and its exposure to ultrasound the formation of a covalent bond between the functional groups E and K is allowed. Accordingly, the ultrasound is of an energy that is sufficient to initiate a sonochemical reaction. Additionally, if $R^{31}$ and $R^{32}$ differ from hydroxyl-, their conversion into hydroxyl groups is allowed. Accordingly, the exposure to ultrasound allows in some embodiments the hydrolysis of precursors (e.g. compounds of the general formulas (IIa) and/or (IIb). At the same time the exposure to ultrasound provides sufficient energy to allow $R^{31}$ and $R^{32}$ to each undergo a chemical reaction with one of the moieties $R^{31}$ and $R^{32}$ of another molecule of the plurality of molecules of the compound of general formulas (IIa) and/or (IIb). As a result a covalent link is formed between these molecules. Upon forming a covalent link, typically $R^{31}$ and $R^{32}$ are converted into a different moiety, linking the respective metal or metalloid atoms. A covalent link between the molecules of the compound of general formula (Ia) and/or (Ib) may for instance be defined by the bridge —O— between the metal or metalloid M of the molecules of the compound of general formulas (IIa) and/or (IIb). In some embodiments a direct bond between the metal or metalloid atoms M may be formed. Thereby the plurality of molecules of the compound of general formulas (IIa) and/or (IIb) is cross-linked.

The present inventors have found that ultrasound of a total energy of about 10 to about 75 kJ, such as about 15-50 or about 20-40, including e.g. about 25 kJ, is typically sufficient to carry out a coating of a surface, in particular of the surface of nanoparticles. The exact energy required or desired may depend on various factors, such as, but not limited to, the size and the geometrical shape of the copolymer desired or the type and concentration of a catalyst used, and can easily be experimentally determined. Ultrasound of any frequency can be used, and an optimal frequency for a given system can conveniently be determined by a brief test series. It has been found that a frequency as low as 20 kHz, which corresponds approximately to the upper frequency limit in humans (see above), is sufficient to carry out the method of the invention. As a comparison, frequencies used in medical sonography to monitor pregnancy can range from 1.6 to 10 MHz. In some embodiments of the invention low frequency ultrasound is accordingly used. It may be selected in the range from about 20 kHz to about 500 kHz, such as about 20 kHz to about 350 kHz, about 20 kHz to about 150 kHz or about 20 kHz to about 50 kHz. Any source may be used to provide the ultrasound to which the second mixture (containing inter alia molecules of a compound of general formula (IIa) and/or (IIb) is exposed. In some embodiments a sonicator with a rod is used. Such sonicators have become common equipment of biochemical, in particular analytical, laboratories, in addition to ultrasonic baths, which are standard equipment in both chemical and biochemical laboratories. In embodiments where a respective sonicator with a rod is used, the tip of the rod is typically source, from which ultrasound spreads to the ambience or a solution.

Without being bound by theory it is assumed that in embodiments where any of $R^{31}$ to $R^{33}$ in the compound of general formula (IIa) and/or (IIb) is an alkoxy group, the above indicated energy levels and frequencies of ultrasound irradiation are required in order to initiate the extensive hydrolysis of molecules of this compound, which is in some embodiments a sol gel precursor. In order to maintain the reaction for a sufficient time, ultrasound will usually be applied for a certain time interval, whether in a constant or pulsed form. Suitable time intervals depend on the dimensions of the reaction, the monomers used, as well as the fragility of any substrate involved (e.g. particles). The lower limit of the required power output of ultrasound can easily be determined by those skilled in the art. Typically, a power output of about 10-500 W, such as about 25-250 W or about 45-150 W will be sufficient to carry out the method of the invention. As an illustrative example, a power of about 60 W may be applied for about 20 min.

As a result a covalent link between the molecules of general formula (IIa) and/or (IIb) is formed. Thereby the plurality of molecules of this compound is allowed to be cross-linked. In total a polymer with two cross-linked blocks is thus formed.

As noted above, in some embodiments the second compound of general formula (IIa), which includes moiety $R^{33}$. Where this moiety differs from hydroxyl-, it is in some embodiments hydrolysed upon exposure to ultrasound. Accordingly, in such embodiments the method includes the conversion of $R^{33}$ into a hydroxyl group. Typically, in such embodiments exposing the mixture to ultrasound further provides sufficient energy to allow moiety $R^{33}$ to form a covalent bond with one of the moieties $R^{31}$, $R^{32}$ or $R^{33}$ of another molecule of the plurality of molecules of the compound of general formula (IIa).

As noted above, the obtained coating on the particle includes a polymer that is covalently linked to the surface of the particle. The surface may be of any shape and material, as long as it is capable of accommodating a selected functional group. The respective surface may for example be a surface area, such as a part of a wall or a portion of a particle surface. Any respective substrate may be used. Generally, the substrate may for example be made of or include any material, as long as its surface is suitable for the method of the invention (see above). Typically the substrate includes or is of a solid material. As an example, a suitable surface, including a surface of such a substrate, may include a metal, a metalloid, ceramics, a metal chalcogenide (such as an oxide), a metalloid chalcogenide (e.g., an oxide), a metal halide or chalcogenide (e.g., oxide) ceramics. Examples of suitable metalloids include, but are not limited to silicon, boron, germanium, antimony and composites thereof. Examples of suitable metals include, but are not limited to iron (e.g. steel), aluminium, gold, silver, chromium, tin, copper, titanium, zinc, aluminium, lead and composites thereof. A respective oxide of any of these metalloids and metals may be used as a metalloid oxide or metal oxide respectively. Illustrative examples of a suitable metal oxide include aluminium oxide ($Al_2O_3$), iron oxide ($Fe_2O_3$ or $Fe_3O_4$, for example), chromium oxide ($Cr_2O_3$ as well as $Cr_2O$), indium oxide, magnesia (MgO), copper oxide (CuO), antimony oxide ($Sb_2O_3$), tin oxide ($SnO_2$), antimony doped tin oxide ("ATO"), caesium oxide ($Cs_2O$), $In_2O_3$, $Mn_2O_3$, PbO, PdO, $SnO_2$, $TiO_2$, ZnO, $ZrO_2$, $La_2O_3$, $Ta_2O_5$, $Nb_2O_5$, $MoO_3$, $V_2O_3$, and composites thereof, for instance a corresponding mixed oxide (e.g. those with pervoskite structure such as $BaTiO_3$ and $PbTiO_3$). Further suitable oxides include natural minerals such as the clay mineral kaolinite, $Al_2Si_2O_5(OH)_4$, the phyllosilicate mineral montmorillonite/smectite (a hydrated sodium calcium aluminum magnesium silicate hydroxide of the formula (Na, Ca)$_{0.33}$(Al,Mg)$_2$ (Si$_4$O$_{10}$)(OH)$_2$.nH$_2$O), illite of approximately the formula (K,H$_3$O)(Al,Mg,Fe)$_2$(Si,Al)$_4$O$_{10}$ [(OH)$_2$, (H$_2$O)], and chlorite such as sodium chlorite, $NaClO_2$, potassium chlorite, $KClO_2$, or magnesium chlorite, $Mg(ClO_2)_2$. Further examples of a chalcogenide include, but are not limited to, a sulphide (e.g. CdS, ZnS, PbS and $Ag_2S$), a selenide (e.g. GaSe, CdSe and ZnSe) and a telluride (e.g. ZnTe or CdTe). Examples of suitable metall halide include, but are not limited to, silver chloride, AgCl, silver bromide, AgBr, and silver iodide, AgI. Examples of a suitable metalloid oxide include, but are not limited to alumina, silica ($SiO_2$), zirconia, boria, titania, ceria, germania, tantalum oxide, yttrium oxide, thoria, and composites thereof. In some embodiments the surface includes or is of the same metal oxide or metalloid oxide as the cross-linked matrix. In some embodiments the surface includes the same metal or metalloid as A or M of the compounds used in the method of the present invention.

As an illustrative example, the surface of the particle may be of quartz or glass. As a further illustrative example, a silicon oxide or germanium oxide surface may be obtained by etching a silicon substrate or germanium substrate, respectively, with piranha solution, i.e. a mixture of sulphuric acid and hydrogen peroxide solution at a molar ratio of 7:3. Examples of ceramics include, but are not limited to, silicate ceramics, oxide ceramics, carbide ceramics or nitride ceramics. The particle/substrate may be of any desired size and form. It may for example be nanosized or micronized, crystal or noncrystal, including or consisting of an inorganic or a biomaterial or a mixture thereof.

As indicated above, the surface of the particle/substrate may be of any geometric properties. The surface may for example be at least essentially smooth. The surface may also be rough to any degree as long as it allows for the formation of a selected functional group and its accessibility for a compound of general formula II (see below). Where desired, the roughness of the surface may be altered. As an illustrative example, a metal oxide or metalloid oxide surface, e.g. a silicon oxide surface, may be ground by means of sand paper (Ferrari, M., et al. *Applied Physics Letters* (2006) 88, 203125-1-203125-3). As a further illustrative example, the surface may be etched (cf e.g. Cao, M. et al., *J. Phys. Chem. B* (2006) 110, 26, 13072-13075), for example using NaOH, KOH, a mixture of HF, HNO3 and ethanol, a "buffered" HF solution containing $NH_4F$, or by ion bombardment using reactive ion etching. In typical embodiments the surface is at least essentially homogenous. In some embodiments the surface is furthermore at least essentially flat. The surface may be polar or apolar, e.g. hydrophilic or hydrophobic. It may for instance be of different, similar or of the same hydrophilic properties when compared to the properties of the coating formed thereon.

As indicated above, any particle, including any nanoparticle, may be used in the method of the present invention. Examples of a suitable nanoparticle include, but are not limited to, a nanocrystal, a nanosphere, a nanorod, a nanotube, a nanowire and a nanocup. A respective particle may be several millimetres, several micrometers, several nanometers in size or smaller. In some embodiments the particle has a maximal size (i.e. in the dimension of its maximal width, e.g. diameter) of about 0.1 to about 1000 nanometers, such as about 1 to about 1000 nm, about 5-900 nm, about 2-200 nm or about 10-600 nm or about 20-500 nm. In some embodiments a plurality of particles, e.g. nanoparticles, is used. In some of such embodiments all particles may be of identical geometry, while in other embodiments (nano)particles of different geometry are used. A respective particle, on which the coating of the invention is formed, may in some embodiments be hollow to any extend. As an illustrative example, a polymer nanocapsule of cucurbit[6]uril (Kim, D., et al., *Angew. Chem. Int. Ed.* (2007) 46, 3471-3474) may be reacted with a compound of formula (Ia) and/or (Ib) and be exposed to the method of the present invention to form a coating thereon. As already indicated above, the particle(s) used are in some embodiments electrically conductive and have in some embodiments magnetic properties.

Providing a particle such as a nanoparticle that is used in the present invention may include providing a nanoparticle and forming functional groups on an accessible surface area of the particle. The linking molecule ethylenediamine may for instance be immobilised on a respective nanoparticle. As a further illustrative example, in embodiments where gold particles are used, an ionisable thiol compound such as 2-dimethylaminoethanethiol hydrochloride may be covalently linked to the surface of the particle. As a further illustrative example, mercapto groups may also be provided on polymer microspheres as disclosed by Yang & Huang (*Macromol. Chem. Phys.* (2005) 206, 1967-1972). The mercapto groups may then undergo a chemical reaction with a functional group that is included in e.g. moiety $R^{20}$ of a compound of general formula (Ia) (see above). As a further example, thiophenedithiobenzoic acid may be grafted onto a metal surface, such as nano crystals. A coordinating solvent may be employed for such purposes. If desired, a surface functionalized with thiophenedithiobenzoic may further be provided with oligo- and polythiophenes containing a carbodithioate group (Querner, C., et al., *Chem. Mater.* (2006) 18, 4817-4826) before immobilising the copolymer of the present invention thereon. Any functional group may be introduced onto the surface of a particle to be used in the method of the present invention that is suitable for forming a covalent bond upon reacting with an alkoxy group (see also below).

The functional group may in some embodiments be directly linked to the matter forming the particle, such as a metal or metalloid. In some embodiments the functional group may be included in a chemical moiety on the surface of the substrate. In some embodiments the functional group may be introduced and thus formed on the surface of the substrate by means of a chemical reaction. For this purpose bifunctional compounds may for instance be used, some of which are also known as cross-linking agents. Such bifunctional compounds include two reactive centers that can each independently undergo a reaction under chosen reaction conditions. Where desired, one of the functional groups may be masked so as to remain unchanged during a first reaction, for example a covalent coupling to the surface. Any suitable bifunctional compound may be used that results in the formation of a selected functional group on the surface. The two functional groups of a respective bifunctional compound may be different or identical. They may include any functional group for a coupling to the surface familiar to those skilled in the art. Examples include, but are not limited to, organometal- (such as organomagnesiumchloride-, e.g. the well known Grignard-reagents, organomercury-, organozincchloride-, organolithium- or organopotassium-groups), organoboron- (e.g. organoboronic acids, organoboronate esters, or organoboranes), chloride, fluoride, bromide, iodide, cyano-, thiocyano-, trifluoromethyl sulfonyl-, p-toluenesulfonyl-, bromobenzenesulfonyl-, nitro-benzenesulfonyl-, methanesulfonyl-, azido-, amino-, amido-, carboxyl- (including anhydrides), hydroxyl-, thio-, and seleno-groups. Examples of compounds with two identical functional groups include, but are not limited to, diols, dicarboxylic acids, dicarboxylic acid anhydrides, diamides, dialdehydes (also as protected by dithioacetals), diamines, dithiols, difunctional dithianes, diselenols, difunctional organoboronic acids or dimetallic compounds.

In some embodiments self-assembled monolayers of a compound with functional groups, e.g. of an alkane thiol or a disulfide, may be provided on a substrate. Such monolayers are well established in the art and an overview is for example given by Witt et al. (*Current Organic Chemistry* (2004) 8, 1763-1797).

In some embodiments the particle is a solid particle with a dimension across its length of below 1 cm, such as 1 mm, 1 µm or 1 nm. Illustrative examples of a particle are magnetic beads and magnetic nanoparticles. A magnetic nanoparticle may for instance include superparamagnetic matter (e.g. $Fe_3O_4$ or $\gamma$-$Fe_2O_3$), such as a core of such matter.

In some embodiments of the method of the invention a respective particle is formed from small molecules such as compounds of general formulas (I), (III), (IV), (V). Accordingly providing a substrate with a surface includes in such embodiments forming one or more such particles. In some embodiments one or more particles that include a metal oxide or a metalloid oxide are provided. These particles are then reacted with small molecules such as compounds of general formulas (I), (III), (IV), (V) and (VI). In any of these embodiments the sol-gel process may be applied, performed according to any desired protocol.

In some embodiments in addition to one or more compounds of the general formulas (I), (III), (IV), (V) and (VI) (see above), which contain a functional group capable of forming a covalent bond with the functional group $G^2$ (see below), an additional compound of comparable structure is employed. This additional compound contains a functional group that is capable of forming a covalent bond with a provided substrate, e.g. the surface of a particle or a nanotube. This additional compound may be added simultaneously or sequentially with the one or more compounds of the general formulas (I), (III), (IV), (V) and (VI). As an illustrative example a particle or nanotube may be functionalised with a mercaptoalkyltrialkoxy-metalloid (e.g. a silane) in a first step, for instance assisted by ultrasound (see e.g. Bottini, M. et al., *J. Phys. Chem. B* (2006) 110, 13685-13688; Mulvaney et al., 2000, supra). Thereafter a compound of one of the general formulas (I), (III), (IV), (V) or (VI) may be added and crosslinked with the immobilised first compound via hydrolysis of alkoxy groups of either of the two compounds.

Accordingly, in some embodiments the method of the invention is a method of forming a particle with a core-shell structure (see also above). As an illustrative visualization, the coating formed by the method of the present invention may be figured as containing two layers or shells, the first, inner layer or shell being formed by the cross-linking of molecules of a compound of formula (Ia) or (Ib), the second, outer layer or shell being formed by the cross-linking of molecules of a compound of formula (IIa) or (IIb). Nevertheless the structure of a particle coated by the method of the present invention may deviate from this simplified illustration. As explained for the surface, on which the copolymer may be formed, the core of such a particle may be of or include any desired material. As an illustration, the respective core may be a metal, a polymer. If desired, a core of a superparamagnetic metal may be selected as described by Aslam et al. (2005, supra).

In yet another aspect the present invention relates to a coating that generally includes a copolymer. The copolymer typically includes two cross-linked blocks. The monomer units defining the first block are of the general formula The monomer units defining the first block are of the general formula (XIIa) and/or (XIIb)

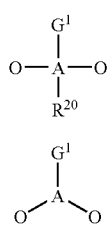

In these formulas, A is a metal or a metalloid. $R^{20}$ in formula (XIIa) is O, an aliphatic, a cyclo-aliphatic, an aromatic, an arylaliphatic or an arylcycloaliphatic group with a main chain that includes 0-3 heteroatoms. $G^1$ is a spacer selected from an aliphatic, a cycloaliphatic, an aromatic, an arylaliphatic, and an arylcycloaliphatic radical that includes a main chain of about 0-2 heteroatoms. One end of the spacer $G^1$ is covalently bonded to the metal or metalloid A. The other end of the spacer $G^1$ is covalently bonded to a linking moiety Q of the monomer units defining the second block. The two oxygen atoms are covalently bonded (i) to the metal or a metalloid A of a further monomer unit of the general formula (XIIa) or (XIIb), respectively, or (ii) to the surface of a substrate. The monomer units defining the second block are of the general formula (XIIIa) and/or (XIIIb)

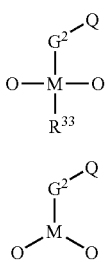

In this formula M is a metal or a metalloid. $R^{33}$ in formula (XIIIa) may be O, an aliphatic, a cycloaliphatic, an aromatic, an arylaliphatic, or an arylcycloaliphatic group with a main chain that includes 0 to about 3 heteroatoms. $G^2$ is a spacer selected from an aliphatic, a cyclo-aliphatic, an aromatic, an arylaliphatic, and an arylcycloaliphatic radical that includes a main chain of about 0-3 heteroatoms. Q is a linking moiety selected O, NH, S, and Se. The two oxygen atoms are covalently bonded to the metal or metalloid M of a further monomer unit of the general formula (XIIIa) or (XIIIb), respectively. In the copolymer, the linking moiety Q is covalently bonded to the spacer $G^1$ of the monomer units of the general formula (XIIa) and/or (XIIb). In some embodiments the monomer units defining the first block and the monomer units defining the second block are different from one another. In some embodiments these two monomers are identical. As illustrated above, a respective coating is obtainable by the method of the present invention.

A coating formed by the method of the invention may serve a variety of purposes. It for instance provides a protective layer on nanoparticles, e.g. by providing photochemical oxidation of nanoparticles (Correa-Duarte, M. A., et al., *Chem. Phys. Lett.* (1998) 286, 497-501). A coating as well as the copolymer of the present invention may be of any surface wettability. Where a germania, alumina, silica, zirconia etc. matrix of hydrophilic surface properties is formed, the wettability may be altered by grafting additional moieties thereon, if desired. As an illustrative example, 3-(triethoxysilyl)propyl-acrylic acid ester (Chemical Abstracts No. 2530-85-0), 3-[tris(1-methylethoxy)silyl]propyl-2-methyl-acrylic acid ester (Chemical Abstracts No. 80750-05-6), 3-(triethoxysilyl)propyl-acrylic acid ester (CAS No. 20208-39-3) or 3-[1-ethyl-3,3,3-trimethyl-1-[(trimethylsilyl)oxy]disiloxanyl]propyl-acrylic acid ester (CAS No. 677736-91-3) may be used to provide the copolymer of the invention with a hydrophobic surface as described by Bauer et al. (*Macromol. Chem. Phys.* (2000) 201, 2654-2659; *Progress in Organic Coatings* (2003) 47, 147-153). A further example of a suitable molecule for a grafting reaction is a polymer such as polyethylene oxide (Hommel et al., *Makromol Chem.* (1993) 194, 879-889).

In yet further embodiments the coating as well as the copolymer according to the present invention may be reacted with a capture molecule that is suitable of binding a biological molecule or entity such as a peptide, a protein, a peptoid, a nucleic acid, an oligonucleotide, an oligosaccharide, a polysaccharide, a lipid, a virus or a microorganism such as a cell. A respective capture molecule may for example be reacted with functional groups K (see above and e.g. FIG. 2B) that did not undergo a covalent linkage in the formation of the copolymer (see above). In this aspect the copolymer of the present invention often eliminates the requirement of including functionalized metal-alkoxide compounds when forming a silica, titania, gallia or germania surface, such as a silicate coating or layer (for an overview of available techniques see Smith, J. E., et al. *Trends in Analytical Chemistry* (2006) 25, 9, 848-854, and Tan, W., et al., *Medicinal Research Reviews* (2004) 24, 5, 621-638).

Examples of a respective capture molecule include, but are not limited to an immunoglobulin, a fragment thereof, a proteinaceous binding molecule with antibody-like functions, an oligonucleotide, an oligosaccharide, an oligopeptide, biotin, dinitrophenol, digoxigenin and a metal chelator (cf also below). Examples of (recombinant) immunoglobulin fragments are $F_{ab}$ fragments, $F_v$ fragments, single-chain $F_v$ fragments (scF$_v$), diabodies, triabodies (Iliades, P., et al., *FEBS Lett* (1997) 409, 437-441), decabodies (Stone, E., et al., *Journal of Immunological Methods* (2007) 318, 88-94) and other domain antibodies (Holt, L. J., et al., *Trends Biotechnol.* (2003), 21, 11, 484-490). An example of a proteinaceous binding molecule with antibody-like functions is a mutein based on a polypeptide of the lipocalin family (WO 03/029462, Beste et al., *Proc. Natl. Acad. Sci. U.S.A.* (1999) 96, 1898-1903). Lipocalins, such as the bilin binding protein, the human neutrophil gelatinase-associated lipocalin, human Apolipoprotein D or glycodelin, posses natural ligand-binding sites that can be modified so that they bind to selected small protein regions known as haptens. Examples of other proteinaceous binding molecules are the so-called glubodies (see e.g. international patent application WO 96/23879 or Napolitano, E. W., et al., *Chemistry & Biology* (1996) 3, 5, 359-367), proteins based on the ankyrin scaffold (Mosavi, L.

K., et al., *Protein Science* (2004) 13, 6, 1435-1448) or crystalline scaffold (e.g. international patent application WO 01/04144) the proteins described in Skerra, *J. Mol. Recognit.* (2000) 13, 167-187, AdNectins, tetranectins and avimers. Avimers contain so called A-domains that occur as strings of multiple domains in several cell surface receptors (Silverman, J., et al., *Nature Biotechnology* (2005) 23, 1556-1561). Adnectins, derived from a domain of human fibronectin, contain three loops that can be engineered for immunoglobulin-like binding to targets (Gill, D. S. & Damle, N. K., *Current Opinion in Biotechnology* (2006) 17, 653-658). Tetranectins, derived from the respective human homotrimeric protein, likewise contain loop regions in a C-type lectin domain that can be engineered for desired binding (ibid.). Peptoids, which can act as protein ligands, are oligo(N-alkyl) glycines that differ from peptides in that the side chain is connected to the amide nitrogen rather than the a carbon atom. Peptoids are typically resistant to proteases and other modifying enzymes and can have a much higher cell permeability than peptides (see e.g. Kwon, Y.-U., and Kodadek, T., *J. Am. Chem. Soc.* (2007) 129, 1508-1509).

As a further illustrative example, an affinity tag may be used as a respective capture molecule. Examples of an affinity tag include, but are not limited to biotin, dinitrophenol or digoxigenin, oligohistidine, polyhistidine, an immunoglobulin domain, maltose-binding protein, glutathione-S-transferase (GST), calmodulin binding peptide (CBP), FLAG'-peptide, the T7 epitope (Ala-Ser-Met-Thr-Gly-Gly-Gln-Gln-Met-Gly), maltose binding protein (MBP), the HSV epitope of the sequence Gln-Pro-Glu-Leu-Ala-Pro-Glu-Asp-Pro-Glu-Asp of herpes simplex virus glycoprotein D, or the hemagglutinin (HA) epitope of the sequence Tyr-Pro-Tyr-Asp-Val-Pro-Asp-Tyr-Ala, the "myc" epitope of the transcription factor c-myc of the sequence Glu-Gln-Lys-Leu-Ile-Ser-Glu-Glu-Asp-Leu.

A kit for coating a particle according to the present invention includes two containers. The first container includes a plurality of molecules of compounds of general formula (Ia) and/or (Ib) (see above). The second container includes a plurality of molecules of a compound of the general formula (IIa) and/or (IIb) (see above). In some embodiments the kit may also include one or more particles, such as nanoparticles.

A respective kit may furthermore include means for forming functional groups on the surface of a particle (see above for illustrative examples). In this regard the kit may also include a linking molecule that can be immobilised on the surface of a particle and that carries a functional group, which is still present after immobilisation. As an illustrative example, 6-mercapto-1-hexanol may be included in the kit.

A respective kit may be used to carry out a method according to the present invention. In this regard the kit may include instructions for coating a particle, for example in form of an instruction leaflet. It may further include one or more devices for accommodating the above components before carrying out a method of the invention, while it carrying out, and thereafter.

Those skilled in the art will appreciate that the advanced surface properties of the surface provided by a copolymer of the present invention will generally lead to less non-specific binding of the biological molecule or entity than conventional coatings of a comparable material (e.g. silica). Furthermore, the underlying molecular chemistry in combination with the application of ultrasound allows for an encapsulation coating on particles that can be grown without the problem of the growth of individual silica. The latter is a well-known downside of the conventional Stöber process. At the same time particles are kept well dispersed in solution, which cannot be achieved by other methods currently available in the art.

In order that the invention may be readily understood and put into practical effect, particular embodiments will now be described by way of the following non-limiting examples. It is understood that modification of detail may be made without departing from the scope of the invention.

Exemplary Embodiments of the Invention

FIG. 1 depicts current approaches of silica coatings to provide an encapsulation or a shell of a particle. FIG. 1A: The silica network is formed directly on a suitable surface by cross-linking with hydroxyl groups thereon. Typically a tetraalkoxysilane is added together with a reducing agent (e.g. TEOS+ammonium hydroxide) into the sol of particles to be coated. FIG. 1B: In the absence of hydroxyl or other suitable groups on the surface of the particle pretreatment with a coupling agent is performed before proceeding to a shell growth step as shown in FIG. 1A.

FIG. 2A shows a simplified view of a coating of the surface of a particle (1) according to the present invention. The first cross-linked block is a metal or metalloid oxide, which contains metal or metalloid atoms sketched by the symbol A. The second cross-linked block is likewise a metal or metalloid oxide, which contains metal or metalloid atoms sketched by the symbol B. Spacers $G^1$ in the first cross-linked block carry a linking moiety D, covalently attached to a linking moiety $G^2$ in the second cross-linked block. The linking moiety D is obtained by a chemical reaction of functional groups K and E (not shown). By a reaction of these two functional groups a covalent bond has been formed, connecting the two cross-linked blocks. FIG. 2B depicts a further coating that includes with two cross-linked blocks, formed according to the method of the present invention. The polymer, immobilised on the surface of a particle (1), resembles the polymer shown in FIG. 3A. Non-reacted functional groups K and E are present in the respective cross-linked block, since not all functional groups E can come in proximity to a functional group F during the reaction. Such remaining, non-reacted functional groups may also be hydrolysed during the reaction.

Figure 3B:
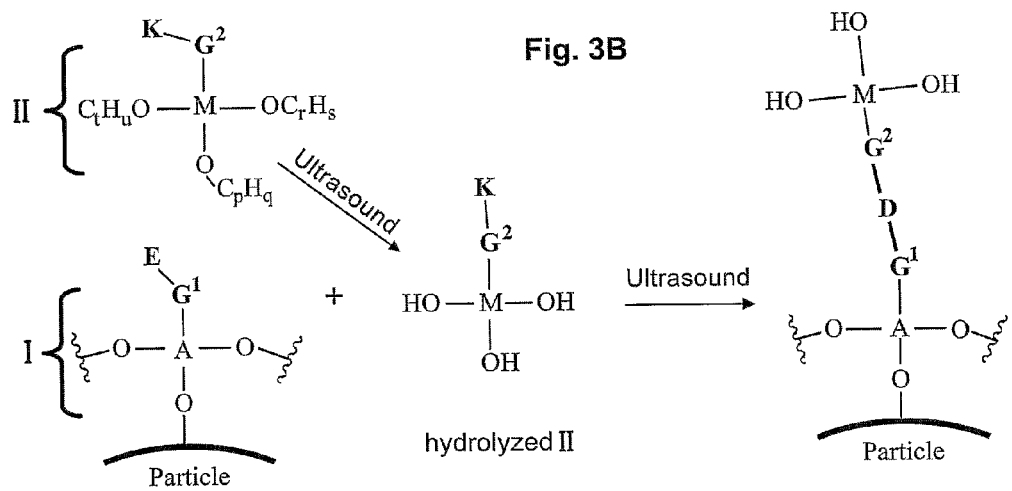

FIG. 3 depicts an example of the method of the present invention. FIG. 3A depicts a surface treatment with a metal or metalloid coupling agent. The coupling agent includes a metal or metalloid atom A with covalently bonded alkoxy groups of the general formula $C_xH_yO$— and $C_vH_wO$—. The coupling agent further includes a linking moiety $G^1$ carrying a functional group E. The functional group E is capable of reacting with the functional group F of a further molecule selected for a subsequent reaction. The coupling agent forms a first cross-linked block, which is in the present example formed on the surface of a particle. FIG. 3B depicts a subsequent reaction with a further molecule. This further molecule has covalently bonded alkoxy groups of the general formula $C_rH_uO$—, $C_rH_sO$-and $C_pH_qO$—. The molecule further includes a linking moiety $G^2$ carrying a functional group K. A chemical reaction between the two functional groups E and K results in a covalent linkage ($G^1$-D-$G^2$). Hydrolysis of the alkoxy groups further results in the formation of a trihydroxy moiety. Ultrasound is applied to assist the reaction.

FIG. 4 depicts examples of compounds suitable to be used as monomers for the formation of coating (including forming a precoating and completing the coating in a subsequent sonochemical process) according to the present invention. A: 3-trimethoxygermylpropylamine (Chemical abstracts No. 342901-42-2); B: (3-aminopropyl)trimethoxy-titanium (CAS No. 679 835-16-6); C: [2-[(6-aminohexyl)amino]

ethyl]-silanetriol (CAS No. 514195-50-7); D: 3-[di-ethoxy (methyl)germyl]propylamine (CAS No. 342901-44-4); E: [3-[[2-[(2-aminoethyl)amino]ethyl]amino]propyl]-silanetriol, (CAS No. 787620-78-4); F: (2-azidoethyl)trimethoxysilane, (CAS No. 83315-71-3); G: [3-(trimethoxysilyl)propyl]-hydrazine (CAS No. 481681-83-8); H: 3-(dimethoxymethylsilyl)propyl-thiocyanic acid ester (CAS 503608-63-7); I: dimethoxy-methyl(3-nitropropyl)-silane (CAS No. 174529-36-3); L: triethoxy[3-[(4-oxiranylbutyl)thio]-propyl]-silane (CAS No. 194672-42-9); J: 11-(trimethoxysilyl)-undecanal (CAS No. 250684-37-8); K: (3-mercaptopropyl)dimethoxysilanol (CAS No. 123381-58-8); L: triethoxy[3-[(4-oxiranyl-butyl)thio]propyl]-silane (CAS No. 194672-42-9); M:3-(dichloromethoxysilyl)-1-propanesulfenyl chloride (CAS No. 109858-50-6); N: 5,6-epoxyhexyltripropoxysilane (CAS No. 35612-74-9); O: 3-(dichloromethylgermyl)-propanal (CAS No. 42202-26-6); P: 3-(dichloro-methylsilyl)-1-propanethiol (CAS No. 88334-68-3); Q: trichloro(8-oxiranyloctyl)-silane (CAS No. 170007-68-8); R: N-[3-(trichlorosilyl) propyl]-1,6-hexanediamine (CAS No. 531492-29-2) and S: N-[3-(trichlorosilyl)propyl]-methanesulfonamide (CAS No. 685901-33-1).

Figure 5:
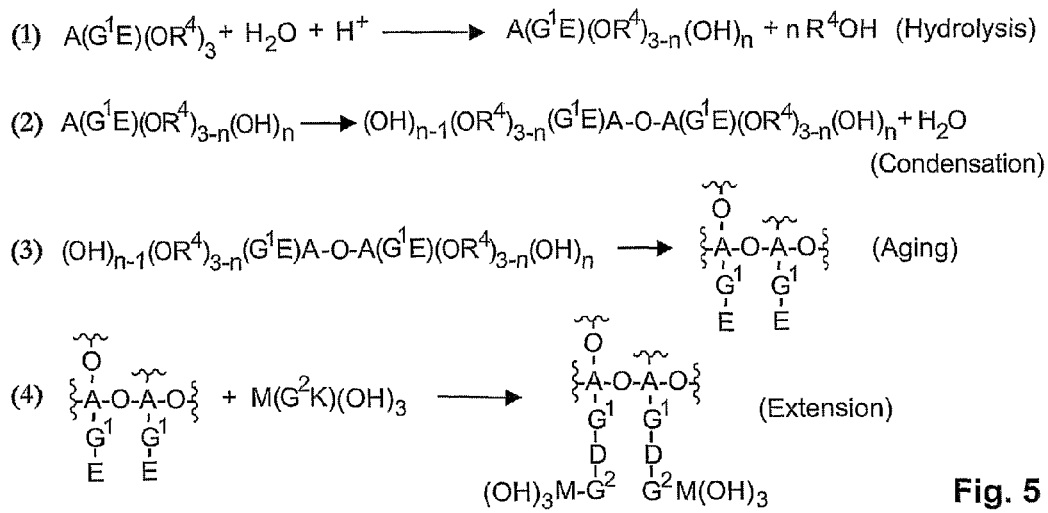
FIG. 5 depicts equations illustrating the coating of particles with a cross-linked matrix of a metal or metal oxide according to the method of the invention.

FIG. 5 depicts the formation of a coating in form of a cross-linked matrix during the method of the invention. The shown example is a sol-gel process. Alkoxy groups of a metal or metalloid (A)-trialkoxy compound with a spacer $G^1$ carrying a functional group E are hydrolysed, for instance by exposure to acidic or basic conditions (1). Condensation polymerisation (2) occurs, followed by a process termed "aging" (3), which results in the formation in a cross-linked matrix gel of the respective metal or metalloid oxide. This part of the reaction may be assisted by evaporation. The crosslinked matrix is extended by reacting the functional group $G^1$ with a trihydroxy metal or metalloid compound, which has a spacer $G^2$ carrying a functional group K. The hydroxy groups may be formed in situ by hydrolysis of the respective alkoxy compound. Ultrasound performs this task.

FIG. 6 shows an exemplary coupling reaction scheme. (Trimethoxysilylpropyl)-ethylenediamine (Chemical Abstracts No. 1760-24-3) is used to form a cross linked matrix on the surface of a particle. The amino groups of the ethylenediamine-moieties are able to react with epoxy groups. 3-(Glycidylmethyloxy)propyltrimethylsilane (Chemical Abstracts No. 2530-83-8) is added, which undergoes a nucleophilic substitution reaction at the epoxy groups on the surface of the particle. As a result a covalent bond is formed, thereby providing a trihydroxy-moiety on the particle surface.

Figure 7:
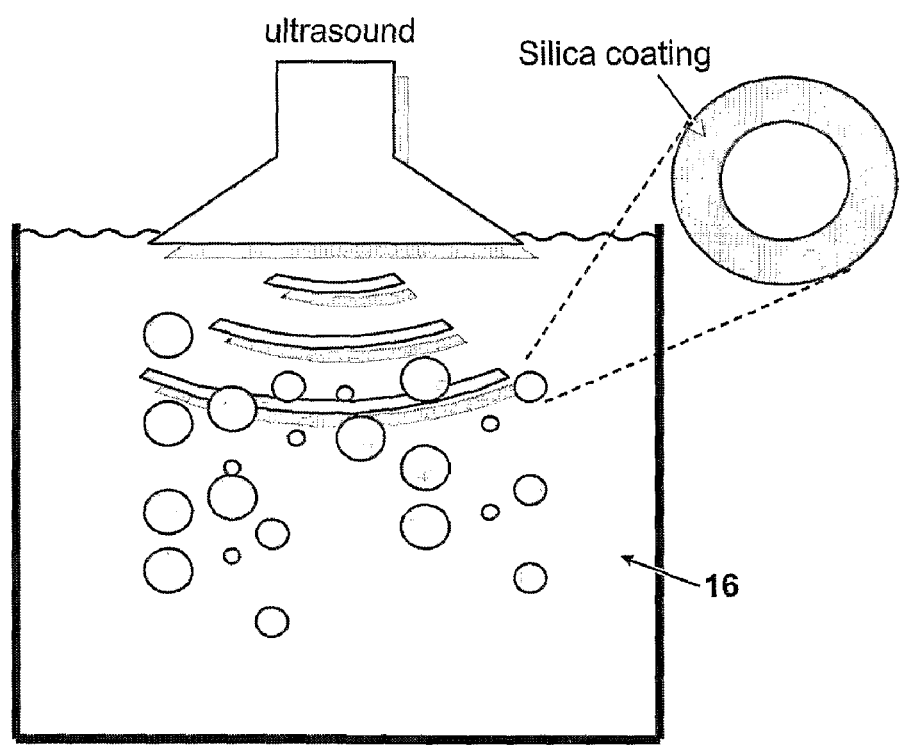
FIG. 7 illustrates an embodiment of forming a coating on particles, which have been provided with a functionalized cross-linked silica matrix.

FIG. 7 illustrates an embodiment of coating of particles using the method of the present invention. A solution of a compound of the general formula II (see detailed description) with hydroxyl- or alkoxy groups (16) is provided and the particles added. The particles have a silica coating (magnification), which includes functional groups that are able to undergo a reaction with the compound of the general formula II. Ultrasound is applied to the solution.

Figure 8:
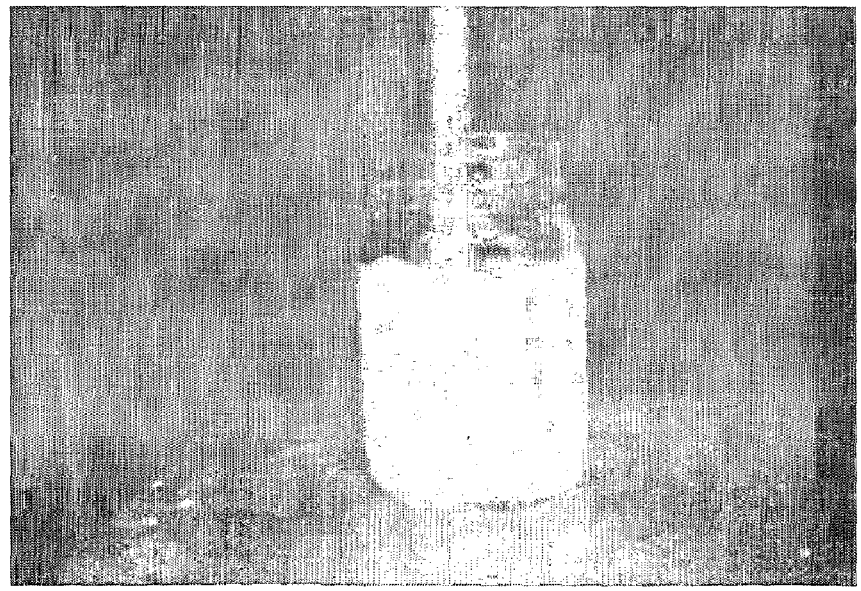
FIG. 8 demonstrates the application of ultrasound to a solution as sketched in FIG. 7, the sol gel process is allowed to proceed by applying ultrasound.

FIG. 8 depicts a process in a preparation according to the method of the present invention application on the laboratory scale. Ultrasound is applied to a solution as shown in FIG. 7, in this example including nanoparticles of indium tin oxide, $In_2O_3$:$SnO_2$. Ultrasound with a power intensity of 30–100 W/cm$^2$, or a bath sonicator of 0.2 W/cm$^2$ was used. The photo demonstrates that the sol-gel process is occurring while the solution is exposed to ultrasound.

Figure 9A:
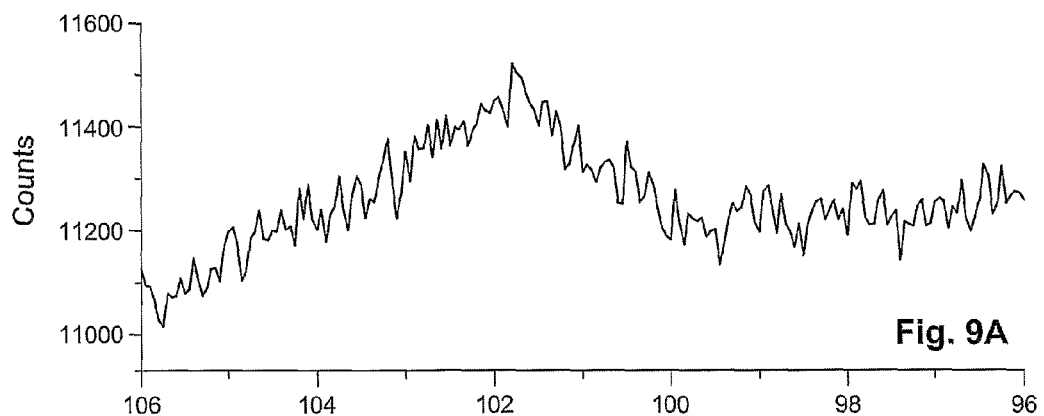
FIG. 9 depicts X-ray photoelectron spectroscopy (XPS) analysis of indium tin oxide (ITO) nanoparticles after forming a precoating using a trialkoxysilane carrying a functional group (FIG. 9A) and an additional second treatment resulting in the formation, i.e. completion of a coating according to the present invention (FIG. 9B).
Figure 9B:
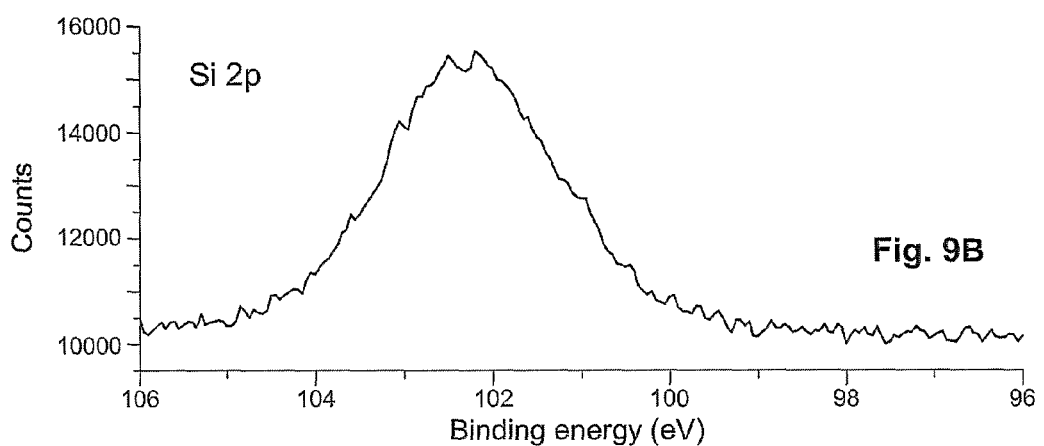

FIG. 9 shows surface chemical analysis of nanoparticles, coated according to the method of the present invention, by X-ray photoelectron spectroscopy. The shown X-ray photoelectron spectra (XPS spectra) of ITO nanoparticles depict the electron binding energy of electrons emitted from the surface of the particles (about 10 to 12 nm of the top of the material). FIG. 9A shows an XPS spectrum of the nanoparticles after treatment with a compound of general formula (Ia) in form of a trialkoxysilane, carrying the functional group functional group E (see detailed description). FIG. 9B shows an XPS spectrum of the nanoparticles after reaction with a compound of the general formula II (see detailed description, full treated particles). There is no peak centered at 102 eV, which is assigned to silicon in silanes in the as received ITO sample (not shown). FIG. 9A shows the presence of a relatively small amount of silicon (see scale on the y-axis) on the particles after treatment with a functionalized trialkoxysilane. In contrast thereto, a significantly increased amount of silicon can be found on fully treated particles after treatment with a compound of the general formula II, as shown in FIG. 9B.

Figure 10A:
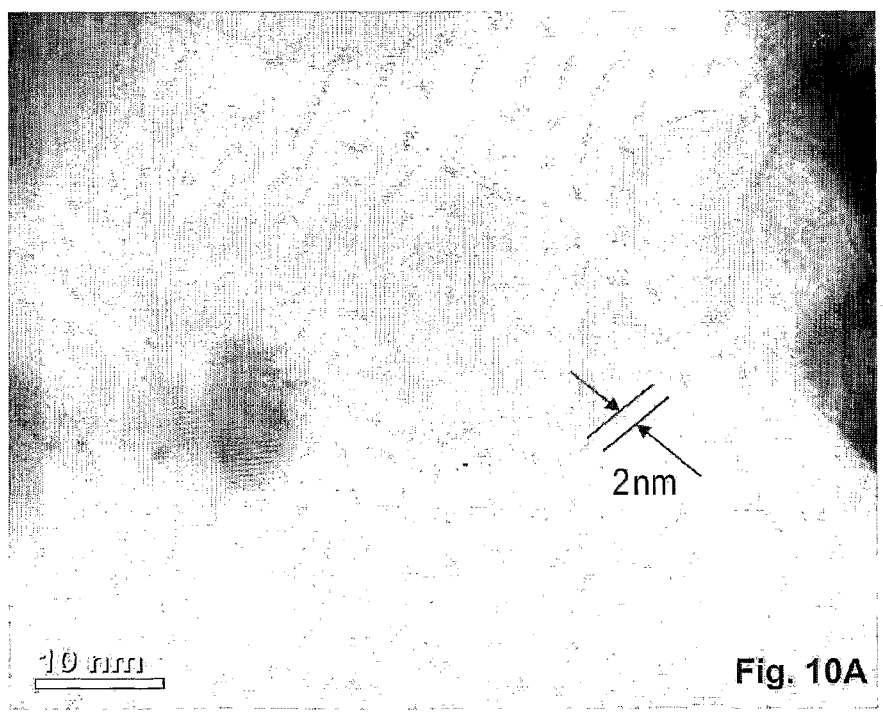
FIG. 10A depicts a transmission electron microscope photo of ITO nanoparticles coated according to the method of the present invention.

FIG. 10A depicts a photo of coated nanoparticles obtained according to the method of the present invention, taken with a transmission electron microscope (TEM). The coating is marked in the photo. FIG. 10B depicts a photo of corresponding uncoated nanoparticles as received.

FIG. 11A shows XPS spectra (O1s binding energy) of untreated nanoparticles ("as received"), after treatment with a trialkoxysilane carrying the functional group functional group $G^1$ ("first step treatment") and after (fully treated). Both untreated nanoparticles and nanoparticles carrying a functionalized trialkoxysilane show a similar profile with a clear signal of the $O^{2-}$ ions in the tetrahedral interstices of face-centered-cubic $In^{3+}$ in indium tin oxide at about 530.3 eV (Song, W., et al., *Appl. Phys. A* (2001) 72, 361-365). After treatment with a compound of the general formula II (see detailed description) this signal is drastically reduced. The dominating O1s peak of these fully treated nanoparticles at about 532.7 eV shows the presence of $SiO_2$ on the surface (see e.g. Zakaznova-Herzog, V. P., et al., *Phys. Rev. B* (2005) 72, 205113).

Figure 11B:
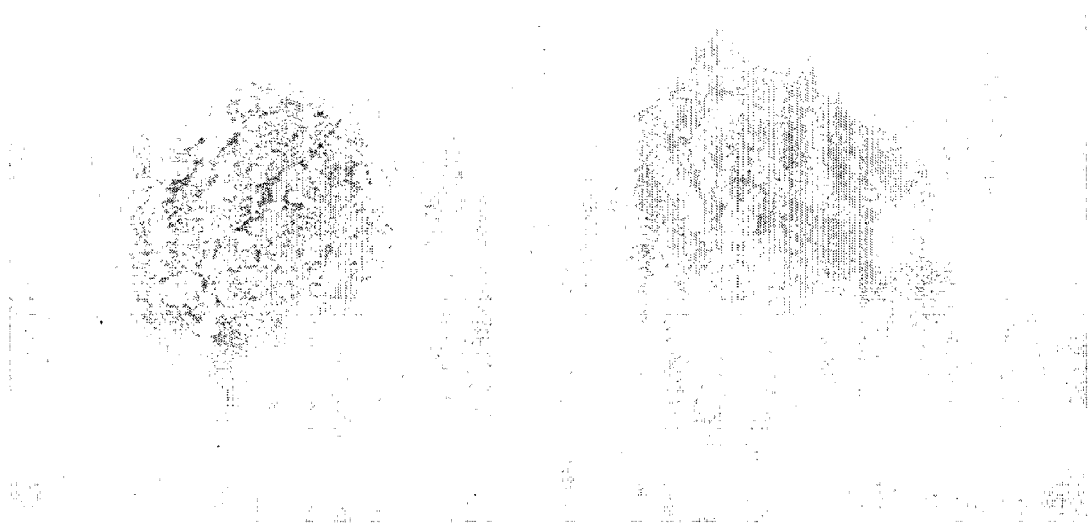
FIGS. 11B and 11C depict photos of dried powder samples.

FIG. 11B depicts photos of dried powder samples. Powder shown on the left half of the photo consists of fully coated nanoparticles (ITO core) obtained by the method of the present invention and exposed to a heat treatment at 200° C. in air for usually 2-6 hours, and in the depicted example for 2 hours. For nanoparticles that had undergone the method of the invention, including treatment with a compound of the general formula (Ia) and a compound of the general formula (IIa), a change in the visual appearance was observed. Their colour changed from bright yellow to dark green. Powder shown on the right half of the photo consists of ITO nanoparticles as received from the supplier, also exposed to a heat treatment at 200° C. in air for usually 2-6 hours, and in the depicted example for 2 hours. No colour change was observed for these nanoparticles.

Figure 11C:
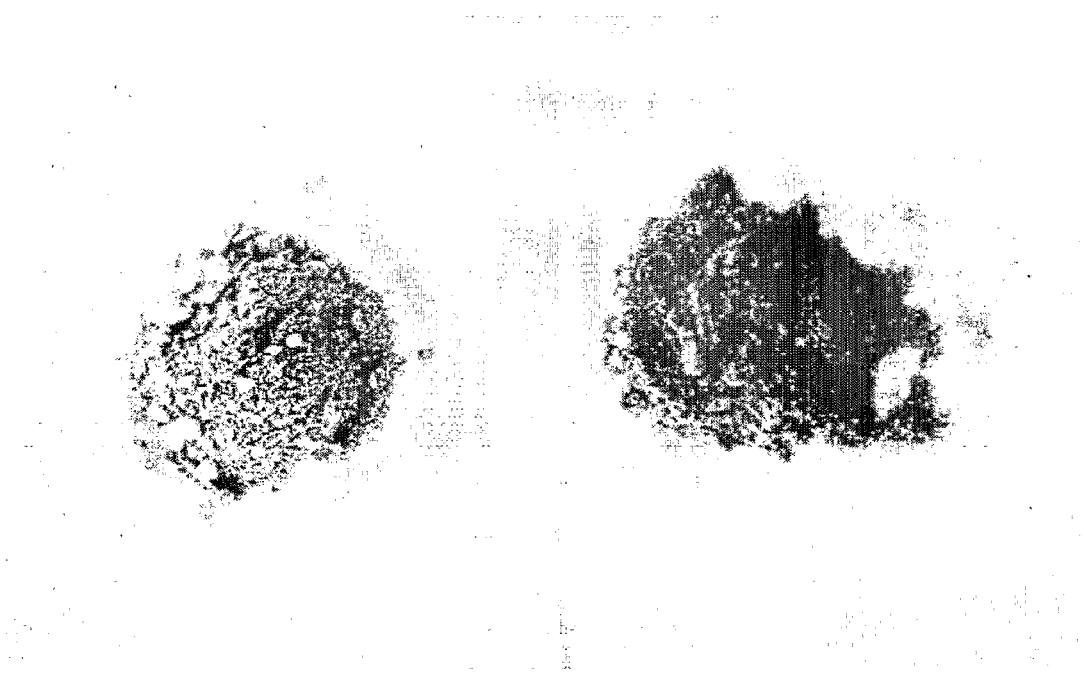

The digital photos depicted in FIG. 11B were saved in the RGB-format. The green and blue channels were deleted and the remaining red channel is shown in FIG. 11C. The ITO nanoparticles on the right half of the photo, which had only been exposed to heat, but did not undergo the method of the invention, are depicted significantly darker in the reproduction of FIG. 11C, reflecting their yellowish-appearance compared to the coated nanoparticles on the left hand side, which had turned dark greenish. Thus these photos illustrate that the oxidation state of the surface of the ITO particles changed, i.e. the material of the particles was reduced, thereby turned into a more conductive state, compared to the corresponding untreated nanoparticles.

Figure 12A:
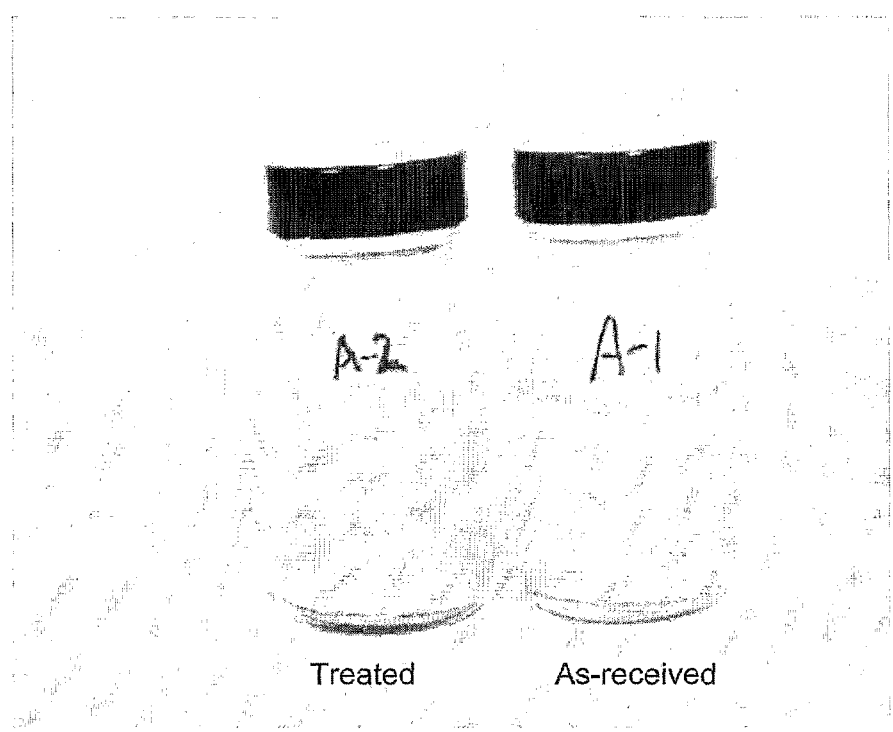
FIG. 12A depicts photos of coated and uncoated ITO nanoparticles dispersed in a mixture of ethanol and water.

FIG. 12A depicts photos of ITO nanoparticles dispersed in an organic mixture. As can be seen the nanoparticles that had undergone the method of the present invention show an enhanced dispersability.

Figure 12B:
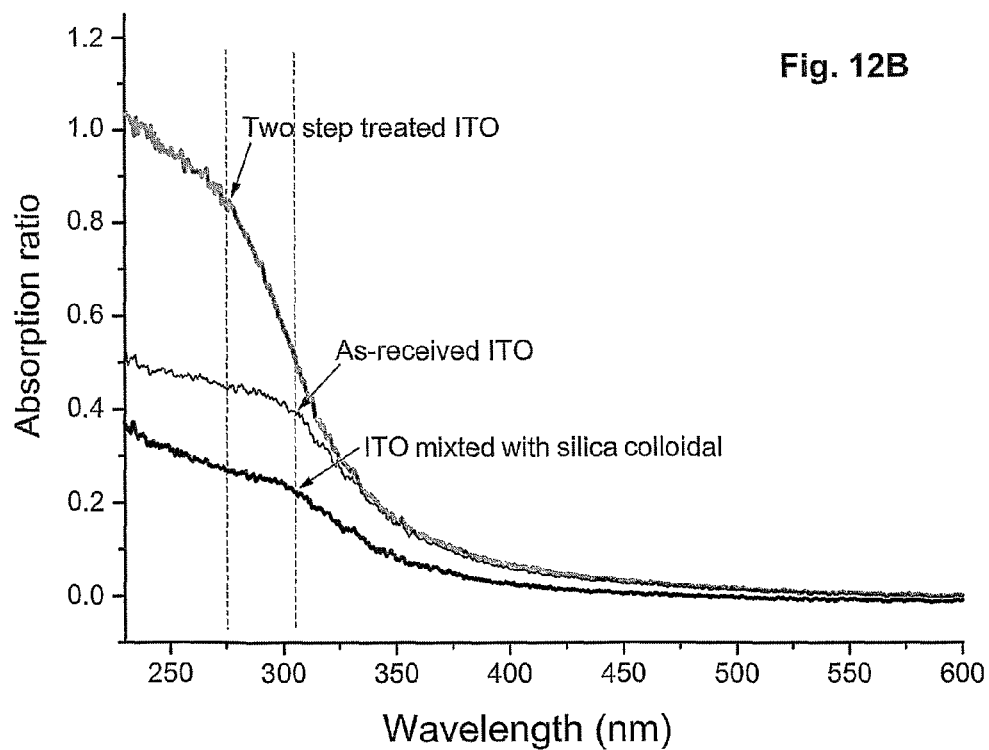
FIG. 12B depicts the absorption edge of a dispersions of untreated ITO nano-particles, of untreated ITO nanoparticles mixed with colloidal silica, and of ITO nanoparticles treated with first a compound of the general formula (Ia) (see detailed description, precoating) and thereafter with a functionalized trialkoxysilane (see detailed description, sonochemical reaction).

FIG. 12B depicts the absorption edge of particle dispersions of untreated ITO nanoparticles, untreated ITO nanoparticles mixed with colloidal silica, and ITO nanoparticles treated with first a compound of the general formula II (see detailed description, full treated particles) and thereafter with a functionalized trialkoxysilane. Note a 30 nm lower shift indicating a widened band gap.

Figure 13:
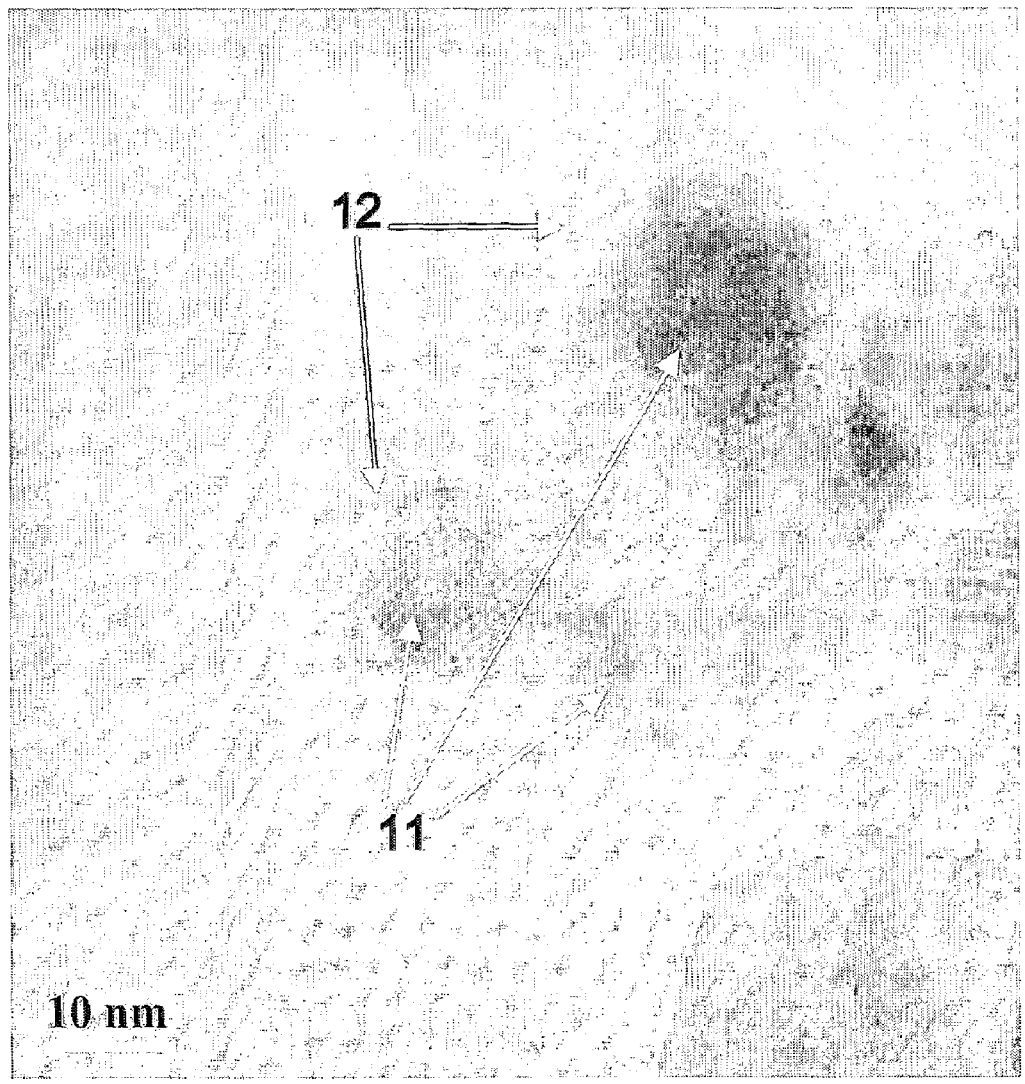
FIG. 13 depicts titania nanoparticles coated according to the method of the present invention.

FIG. 13 depicts fully treated titania nanoparticles obtained according to the same method of the present invention as used for ITO nanoparticles (titania nanoparticles were obtained from Degussa, Germany).

Materials

Particles that were subjected to the method of the invention, were nanosized ITO particles (lot #49N-5090, LAM 635NITO), obtained from Inframat Advanced Materials, CT 06279, USA. The mean particle size stated by the supplier is 40 nm and the specific area 40 $m^2/g$.

Chemical reagents: N-aminoethyl-3-aminopropyltrimethoxysilane, available under the name "Dynasylan DAMO" and 3-Glycidyloxypropyltrimethoxysilane, available under the name "Dynasylan GLYMO" were from Degussa, Germany.

As a source of ultrasound, an ultrasonicator of the type "Sonic Dismembrator" (model 550), purchased from Fisher Scientific (SEA) Pte. Ltd., was used.

First Step Treatment

A typical treatment process was carried out as follows. 2~6 g of as-received ITO particles were added into 20 ml of water under vigorously stirring, to disperse and to wetten the surface of the particles in water. About 4~8 ml of acetic acid was slowly added into the mixture under stirring, whereafter a comparable amount (4~8 ml) of Dynasylan DAMO was slowly added into the dispersion. The mixture was kept at reflux at 80° C. for 4~12 hours. Afterward the ITO particles were collected by centrifugation and three times washed with water and ethanol successively. The obtained particles were grafted with a siloxane network and reactive amino group as indicated by XPS data shown in FIG. 10B.

Second Step Treatment Under Ultrasound Irradiation

A typical treatment process of this step is as follows. 10 g of Dynasylan GLYMO were mixed with 2~5 g ethanol under stirring and slowly mixed with 20 g of water, acidified by hydrochloride acid (pH=2.0). Thereafter 4 g of the above aminosilane treated powder was added into the mixture. The mixture was contained by a 100 ml flask (glass) and immediately after mixing the flask was placed under the probe of the sonicator for ultrasound irradiation. The surface of the probe was immersed into the liquid level no deeper than 1 cm to ensure that most of the mixture was exposed to ultrasound irradiation. The sonicator was set to continuous operation with an output power of 60 W. The start of the sol gel chemical reaction was visible by a burst of white foam in the mixture, indicating extensive hydrolysis of GLYMO. The sonification was kept for at least 20 min, and vigorous stirring was further maintained for several hours after the end of exposure to ultrasound. The obtained particles were coated with a layer of silica as indicated by XPS and TEM shown in FIG. 10A and FIG. 11A.

As used herein, approximating language may be applied to modify any quantitative representation that may vary without resulting in a change in the basic function to which it is related. Accordingly, a value modified by a term or terms, such as "about" and "substantially" includes, but may not to be limited to the precise value specified, in some cases.

The listing or discussion of a previously published document in this specification should not necessarily be taken as an acknowledgement that the document is part of the state of the art or is common general knowledge.

The inventions illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A method of coating a particle, the method comprising:
(a) providing a particle, wherein the surface of the particle comprises functional groups suitable to undergo a coupling reaction with at least one of a hydroxyl group, a halogen group, and an alkoxy group;
(b) providing molecules of a compound of general formula (Ia) and/or (Ib)

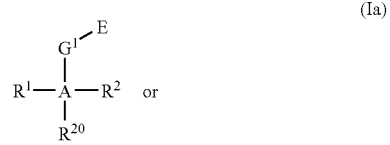

wherein

A is a metal or a metalloid;

$R^1$, and in formula (Ia) $R^2$, are an independently selected halogen or alkoxy group, the alkoxy group comprising a moiety selected from the group consisting of an aliphatic, a cycloaliphatic, an aromatic, an arylaliphatic, and an arylcycloaliphatic group comprising 0-4 heteroatoms;

$R^{20}$ is selected from the group consisting of OH, halogen, and an alkoxy group, the alkoxy group comprising a moiety selected from the group consisting of an aliphatic group, a cycloaliphatic group, an aromatic group, an arylaliphatic group, and an arylcycloaliphatic group;

$G^1$ is a spacer selected from the group consisting of an aliphatic, a cycloaliphatic, an aromatic, an arylaliphatic, and an arylcycloaliphatic radical comprising 0-3 heteroatoms; and E is a functional group;

(c) contacting the molecules of the compound of general formula (Ia) and/or (Ib) and the particle, thereby forming a first mixture;

(d) exposing the first mixture to reaction conditions suitable for a coupling reaction between the functional groups on the surface of the particle and $R^{20}$, thereby (i) allowing the formation of covalent links by a reaction between functional groups on the surface of the particle and moieties $R^{20}$ of molecules of the compound of general formula (Ia) and/or (Ib), thereby immobilising molecules of the compound of general formula (Ia) and/or (Ib) on the surface of the particle, and (ii) allowing cross-linking of the molecules of the compound of general formula (Ia) and/or (Ib), such that a precoating is formed on the particle;

(e) adding molecules of a compound of the general formula (IIa) and/or (IIb)

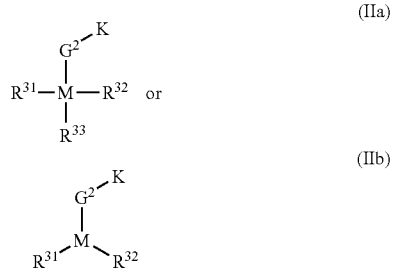

wherein M is a metal or a metalloid;

$R^{31}$ and $R^{32}$ are independently selected from the group consisting of halogen, a hydroxyl group, and an alkoxy group, the alkoxy group comprising a moiety selected from the group consisting of an aliphatic, a cycloaliphatic, an aromatic, an arylaliphatic and an arylcycloaliphatic group comprising 0-4 heteroatoms;

in formula (IIa) $R^{33}$ is selected from the group consisting of OH, halogen, an aliphatic group, a cycloaliphatic group, an aromatic group, an arylaliphatic group, and an arylcycloaliphatic group;

$G^2$ is a spacer selected from the group consisting of an aliphatic, a cycloaliphatic, an aromatic, an arylaliphatic, and an arylcycloaliphatic radical comprising 0-3 heteroatoms; and K is a functional group that is suitable for forming a covalent bond with the functional group E of the compound of general formula (Ia) and/or (Ib);

thereby forming a second mixture;

(f) exposing the second mixture to ultrasound, thereby (i) allowing the formation of covalent links by an intermolecular reaction between functional groups E of the precoating formed in (d) and functional groups K of molecules of the compound of general formula (IIa) and/or (IIb) added in (e), and (ii) providing sufficient energy to allow cross-linking of the molecules of the compound of general formula (IIa) and/or (IIb), such that a coating is formed on the particle.

2. The method of claim 1, wherein the functional group E is selected from the group consisting of an aldehyde, an amino, a nitro, a halogen, an azo, a diazo, a hydrazo, a thio, a cyano, a carboxyl, an ester, an anhydride, a sulphonate, a sulphonate ester, an imido ester, a semicarbazide, an isocyano, an aziridine, a phosphoramidite and an epoxy group.

3. The method of claim 1, wherein the functional group K is selected from the group consisting of an aldehyde, an amino, a nitro, a halogen, an azo, a diazo, a hydrazo, a thio, a cyano, a carboxyl, an ester, an anhydride, a sulphonate, a sulphonate ester, an imido ester, a semicarbazide, an isocyano, an aziridine, a phosphoramidite and an epoxy group.

4. The method of claim 1, wherein in formula (IIa) $R^{33}$ is selected from the group consisting of an aliphatic group, a cycloaliphatic group, an aromatic group, an arylaliphatic group, and an arylcycloaliphatic group, the group comprising 0-4 heteroatoms.

5. The method of claim 1, wherein in formula (Ia) $R^{20}$ and/or in formula (IIa) $R^{33}$ are an independently selected alkoxy group, the alkoxy group comprising a moiety selected from the group consisting of an aliphatic, a cycloaliphatic, an aromatic, an arylaliphatic, and an arylcycloaliphatic group, the group comprising 0-3 heteroatoms.

6. The method of claim 1, wherein the functional groups on the surface of the particle comprise at least one of a hydroxy group, a thio group, a seleno group and an amino group.

7. The method of claim 1, wherein the covalent link between the surface of the particle and the compound of general formula (Ia) and/or (Ib) is the bridge —O—, the bridge —S—, the bridge —Se— or the bridge —NH— to the metal or metalloid A of the compound of general formula (Ia) and/or (Ib).

8. The method of claim 1, wherein the covalent link formed by a reaction of functional groups E and K is the bridge —O—, the bridge —S—, the bridge —Se— or the bridge —NH—.

9. The method of claim 1, wherein M in formula (IIa) is one of Si, Ti, Zr, Ga and Ge, or wherein M in formula (IIb) is Al.

10. The method of claim 1, wherein A in formula (Ia) is one of Si, Ti, Zr, Ga and Ge, or wherein A in formula (Ib) is Al.

11. The method of claim 1, wherein the particle comprises or consists of a material selected from the group consisting of a metal, a metalloid, a metal chalcogenide, a metalloid chalcogenide, a metal halide, ceramics, chalcogenide ceramics, plastic, an elastomer, and any composite thereof.

12. The method of claim 11, wherein the metal chalcogenide is selected from the group consisting of zinc oxide (ZnO), titania ($TiO_2$), indium oxide ($In_2O_3$), an iron oxide, aluminium oxide ($Al_2O_3$), tin oxide ($SnO_2$), antimony oxide ($Sb_2O_3$), a chromium oxide, magnesium oxide (MgO), copper oxide (CuO), caesium oxide ($Cs_2O$), a manganese oxide, PbO, PdO, $ZrO_2$, $La_2O_3$, $Ta_2O_5$, $Nb_2O_5$, $MoO_3$, $V_2O_3$, CdS, ZnS, PbS, $Ag_2S$, GaSe, CdSe, ZnSe, ZnTe, CdTe and any combination thereof.

13. The method of claim 1, wherein the particle is a nanoparticle.

14. The method of claim 1, wherein the reaction is carried out in a solvent selected from water and an alcohol.

15. The method of claim 1, wherein cross-linking the plurality of molecules of the compound of general formula I and/or cross-linking the plurality of molecules of the compound of general formula II comprises the sol-gel method.

16. The method of claim 1, wherein the ultrasound, to which the second mixture is exposed, has a total energy of about 10 to about 75 kJ.

17. The method of claim 1, wherein the ultrasound, to which the second mixture is exposed, has a frequency selected in the range from about 20 kHz to about 500 kHz.

18. A coating obtainable according to the method of claim 1.

19. A particle with a coating according to claims 18.

20. A kit for coating a particle, the kit comprising:
(a) one container comprising molecules of a compounds of general formula (Ia) and/or (Ib)

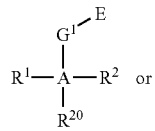

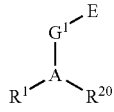

wherein
A is a metal or a metalloid;
$R^1$, and in formula (Ia) $R^2$, are an independently selected halogen or alkoxy group, the alkoxy group comprising a moiety selected from the group consisting of an aliphatic, a cycloaliphatic, an aromatic, an arylaliphatic, and an arylcycloaliphatic group comprising 0-4 heteroatoms;
$R^{20}$ is selected from the group consisting of OH, halogen, and an alkoxy group, the alkoxy group comprising a moiety selected from the group consisting of an aliphatic group, a cycloaliphatic group, an aromatic group, an arylaliphatic group, and an arylcycloaliphatic group;
$G^1$ is a spacer selected from the group consisting of an aliphatic, a cycloaliphatic, an aromatic, an arylaliphatic, and an arylcycloaliphatic radical comprising 0-3 heteroatoms; and
E is a functional group;
(b) one container comprising molecules of a compound of the general formula (IIa) and/or (IIb)

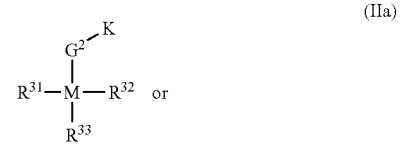

wherein M is a metal or a metalloid;
$R^{31}$ and $R^{32}$ are independently selected from the group consisting of halogen, a hydroxyl group, and an alkoxy group, the alkoxy group comprising a moiety selected from the group consisting of an aliphatic, a cycloaliphatic, an aromatic, an arylaliphatic and an arylcycloaliphatic group comprising 0-4 heteroatoms;
in formula (IIa) $R^{33}$ is selected from the group consisting of OH, halogen, an aliphatic group, a cycloaliphatic group, an aromatic group, an arylaliphatic group, and an arylcycloaliphatic group;
$G^2$ is a spacer selected from the group consisting of an aliphatic, a cycloaliphatic, an aromatic, an arylaliphatic, and an arylcycloaliphatic radical comprising 0-3 heteroatoms; and
K is a functional group that is suitable for forming a covalent bond with the functional group E of the compound of the general formula (Ia) and/or (Ib).

* * * * *